United States Patent
Itagaki et al.

(10) Patent No.: US 10,560,319 B2
(45) Date of Patent: Feb. 11, 2020

(54) COMMUNICATION APPARATUS AND COMMUNICATION METHOD

(71) Applicant: SONY CORPORATION, Tokyo (JP)

(72) Inventors: Takeshi Itagaki, Saitama (JP); Tomoya Yamaura, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 113 days.

(21) Appl. No.: 15/509,071

(22) PCT Filed: Aug. 4, 2015

(86) PCT No.: PCT/JP2015/072106
§ 371 (c)(1),
(2) Date: Mar. 6, 2017

(87) PCT Pub. No.: WO2016/067696
PCT Pub. Date: May 6, 2016

(65) Prior Publication Data
US 2017/0279673 A1   Sep. 28, 2017

(30) Foreign Application Priority Data
Oct. 31, 2014   (JP) .................. 2014-223534

(51) Int. Cl.
*H04L 12/14* (2006.01)
*H04L 12/28* (2006.01)
(Continued)

(52) U.S. Cl.
CPC .......... *H04L 41/0803* (2013.01); *H04L 12/28* (2013.01); *H04L 45/74* (2013.01);
(Continued)

(58) Field of Classification Search
CPC ..... H04L 41/0803; H04L 12/28; H04L 45/74; H04L 45/04; H04W 74/08; H04W 72/12; H04W 84/12; H04W 76/11
See application file for complete search history.

(56) References Cited

U.S. PATENT DOCUMENTS

| 2005/0002355 A1 | 1/2005 | Takano |
| 2008/0137605 A1 | 6/2008 | Berg |

(Continued)

FOREIGN PATENT DOCUMENTS

| JP | 2004-328570 A | 11/2004 |
| JP | 2005-354181 A | 12/2005 |

(Continued)

OTHER PUBLICATIONS

International Search Report dated Oct. 20, 2015 in PCT/JP2015/072106 filed Aug. 4, 2015.

(Continued)

*Primary Examiner* — Yemane Mesfin
*Assistant Examiner* — Intekhaab A Siddiquee
(74) *Attorney, Agent, or Firm* — Xsensus LLP

(57) ABSTRACT

[Object] To provide a communication apparatus and a communication method, which are capable of improving the communication efficiency while preventing collision of responses in communication of responses to frames transmitted to a plurality of communication apparatuses.
[Solution] Provided is a communication apparatus, including: a processing unit configured to generate a frame indicating designation information designating a transmission process for multiplexing differing for each of a plurality of other communication apparatuses; and a communication unit configured to transmit the frame generated by the processing unit to the plurality of other communication apparatuses. Also provided is a communication apparatus, (Continued)

including: a processing unit configured to perform a reception process of receiving a frame from another communication apparatus, and process a response to the frame in accordance with a transmission process indicated from the other communication apparatus, the transmission process differing for each of a plurality of communication apparatuses.

14 Claims, 30 Drawing Sheets

(51) Int. Cl.
*H04L 12/741* (2013.01)
*H04W 72/12* (2009.01)
*H04W 76/11* (2018.01)
*H04L 12/715* (2013.01)
*H04J 11/00* (2006.01)
*H04J 13/16* (2011.01)
*H04W 74/08* (2009.01)
*H04W 84/12* (2009.01)
*H04L 12/24* (2006.01)

(52) U.S. Cl.
CPC ............ *H04W 72/12* (2013.01); *H04L 45/04* (2013.01); *H04W 76/11* (2018.02)

(56) References Cited

U.S. PATENT DOCUMENTS

| | | | |
|---|---|---|---|
| 2012/0106531 A1* | 5/2012 | Seok | H04B 7/0452 370/338 |
| 2012/0257605 A1* | 10/2012 | Abraham | H04B 7/0626 370/338 |
| 2014/0126509 A1 | 5/2014 | You | |
| 2016/0113034 A1* | 4/2016 | Seok | H04W 74/04 370/329 |

FOREIGN PATENT DOCUMENTS

| | | |
|---|---|---|
| JP | 2007-214920 A | 8/2007 |
| JP | 2007-537654 A | 12/2007 |
| WO | WO 2012/173326 A1 | 12/2012 |

OTHER PUBLICATIONS

Extended European Search Report dated May 16, 2018 in Patent Application No. 15854687.9 citing references AA-AB and AO therein, 6 pages.

* cited by examiner

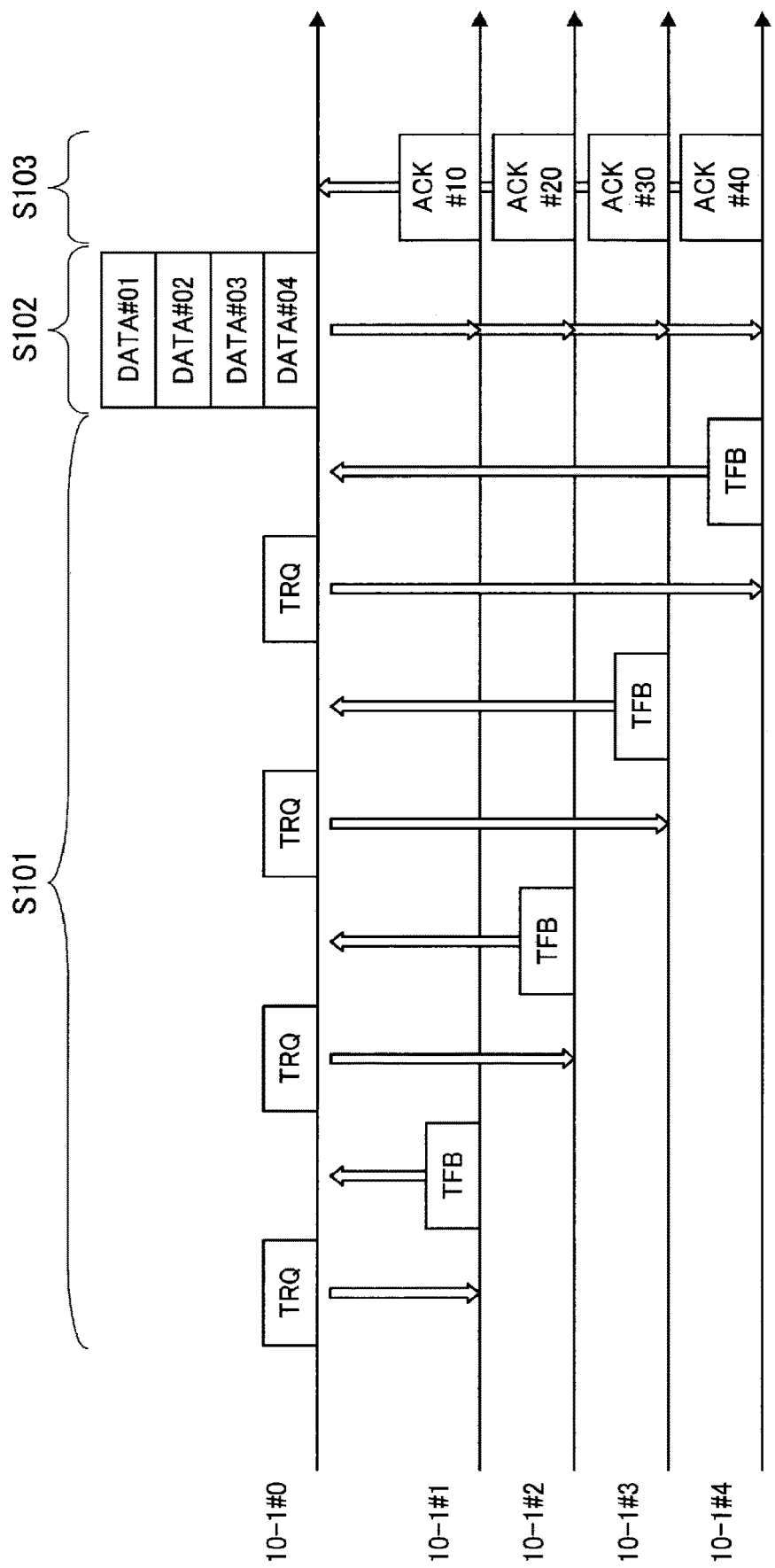

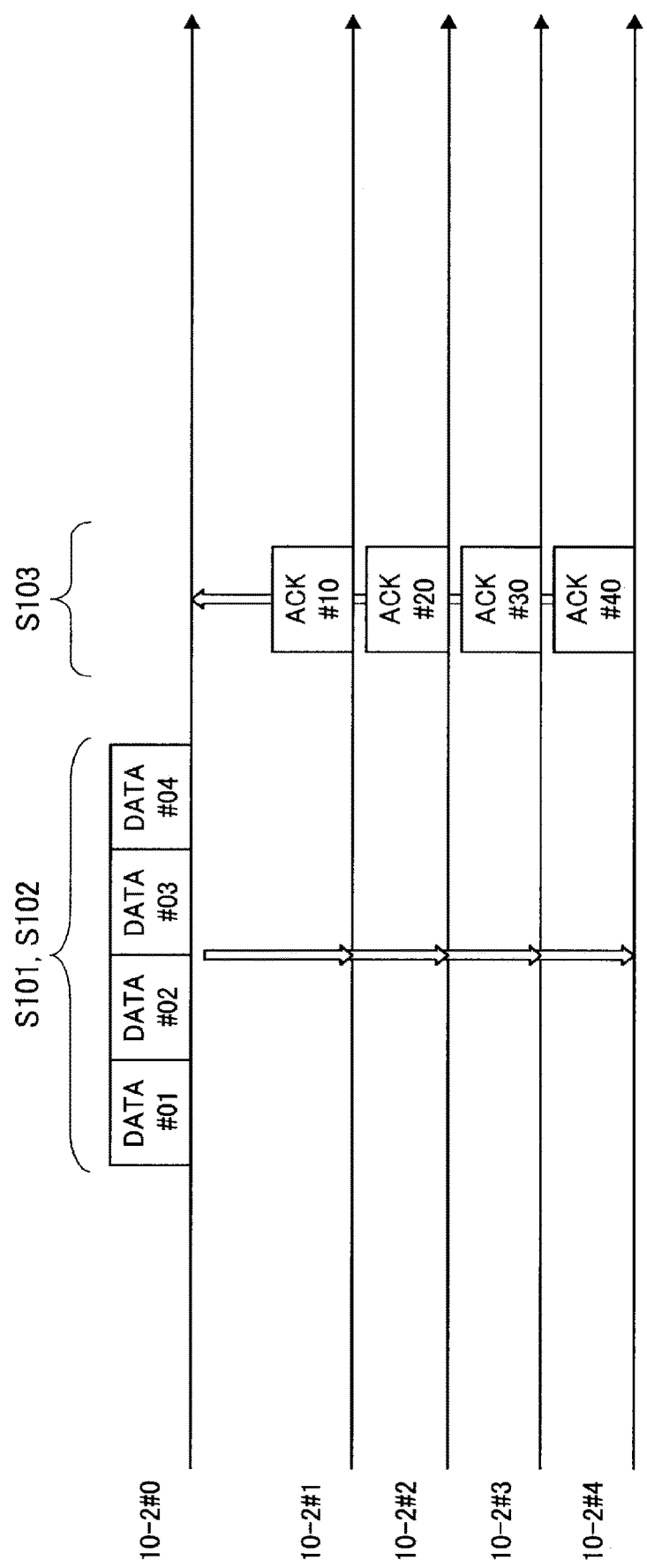

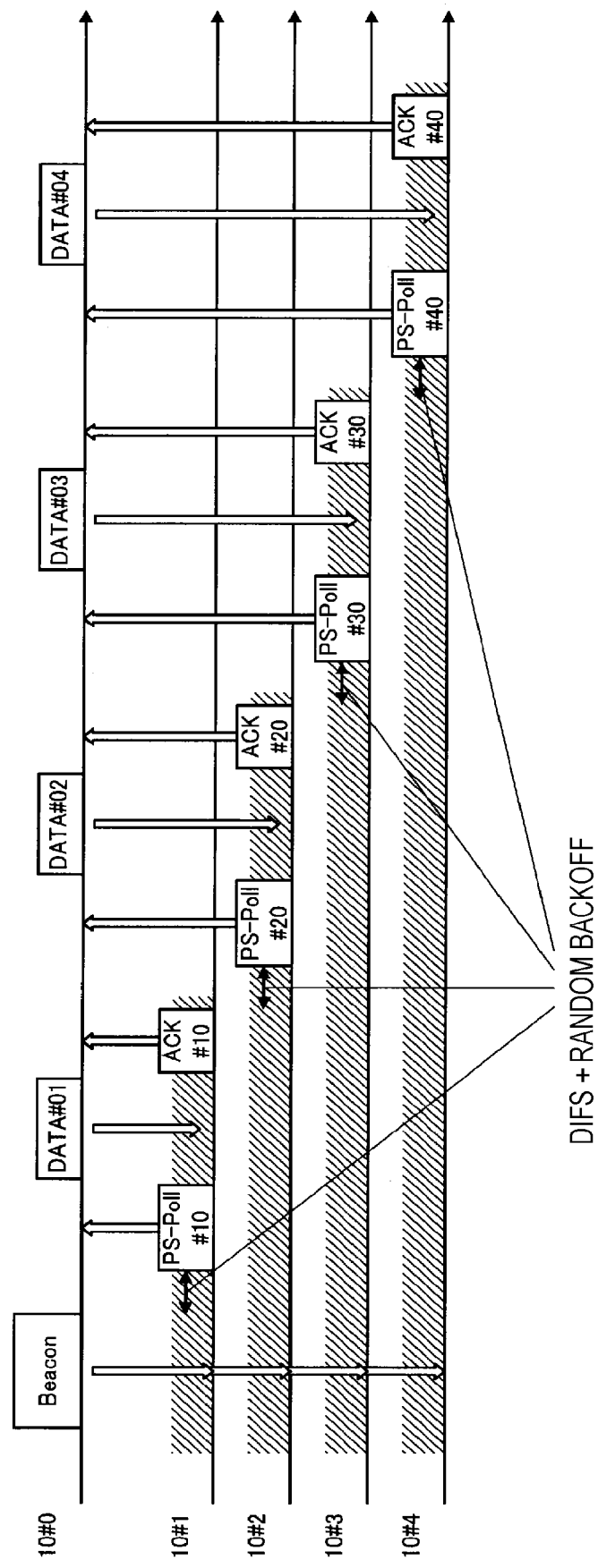

COMMUNICATION APPARATUS AND COMMUNICATION METHOD

TECHNICAL FIELD

The present disclosure relates to communication apparatuses and communication methods.

BACKGROUND ART

Wireless local area networks (LANs), typified by IEEE (Institute of Electrical and Electronics Engineers) 802.11, have in recent years been widespread, leading to an increase in the information amount of transmitted contents and the number of wireless LAN-capable products. Therefore, to improve the efficiency of communication over an entire network, the standard IEEE 802.11 is still being enhanced.

In the 802.11ac standard, which is an example enhanced version of the standard IEEE 802.11, multi-user multi-input multi-output (MU-MIMO) is employed for a downlink (DL). MU-MIMO is a technique for allowing transmission of a plurality of signals during the same period of time through space-division multiplexing. The technique can improve the efficiency of use of frequencies, for example.

As a method for improving the efficiency of DL transmission, a technique different from MU-MIMO has been proposed. For example, Patent Literature 1 discloses a technique of transmitting a DL frame generated by connection of a plurality of packets having different destinations to each of communication apparatuses serving as the destinations. Thus, it is possible to improve the communication efficiency in packet transmission to a plurality of communication apparatuses.

CITATION LIST

Patent Literature

Patent Literature 1: JP 2007-537654T

DISCLOSURE OF INVENTION

Technical Problem

However, in DL-MU-MIMO or the technique disclosed in Patent Literature 1, there is a possibility of a response to the DL frame not being received. For example, when each of the communication apparatuses that have received the DL frame transmits the response to the DL frame at the same timing, the responses may collide.

On the other hand, in the 802.11ac standard, only one of a plurality of communication apparatuses that have received the DL frame is permitted to transmit the response. Thereafter, the other communication apparatuses are permitted to transmit the response when there is a response transmission request from a transmitting station of the DL frame. For this reason, it takes time until communication related to the response is completed, and the communication efficiency may decrease.

In this regard, the present disclosure proposes a communication apparatus and a communication method, which are novel and improved and capable of improving the communication efficiency while preventing collision of responses in communication of responses to frames transmitted to a plurality of communication apparatuses.

Solution to Problem

According to the present disclosure, there is provided a communication apparatus, including: a processing unit configured to generate a frame indicating designation information designating a transmission process for multiplexing differing for each of a plurality of other communication apparatuses; and a communication unit configured to transmit the frame generated by the processing unit to the plurality of other communication apparatuses.

According to the present disclosure, there is provided a communication apparatus, including: a processing unit configured to perform a reception process of receiving a frame from another communication apparatus, and process a response to the frame in accordance with a transmission process indicated from the other communication apparatus.

According to the present disclosure, there is provided a communication method, including: generating a frame indicating designation information designating a transmission process for multiplexing differing for each of a plurality of other communication apparatuses; and transmitting the generated frame to the plurality of other communication apparatuses.

According to the present disclosure, there is provided a communication method, including: performing a reception process of receiving a frame from another communication apparatus; and processing a response to the frame in accordance with a transmission process indicated from the other communication apparatus, the transmission process differing for each of a plurality of communication apparatuses.

Advantageous Effects of Invention

As described above, according to the present disclosure, a communication apparatus and a communication method capable of improving communication efficiency while preventing collision of responses in communication of responses to frames transmitted to a plurality of communication apparatuses are provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of a frame exchange sequence according to the present embodiment.

FIG. 10 is a diagram illustrating an example of a frame exchange sequence according to a second embodiment of the present disclosure.

FIG. 20 is a diagram illustrating an example of a frame exchange sequence performed in communication in a power save mode according to a related art.

MODE(S) FOR CARRYING OUT THE INVENTION

Figure 1:
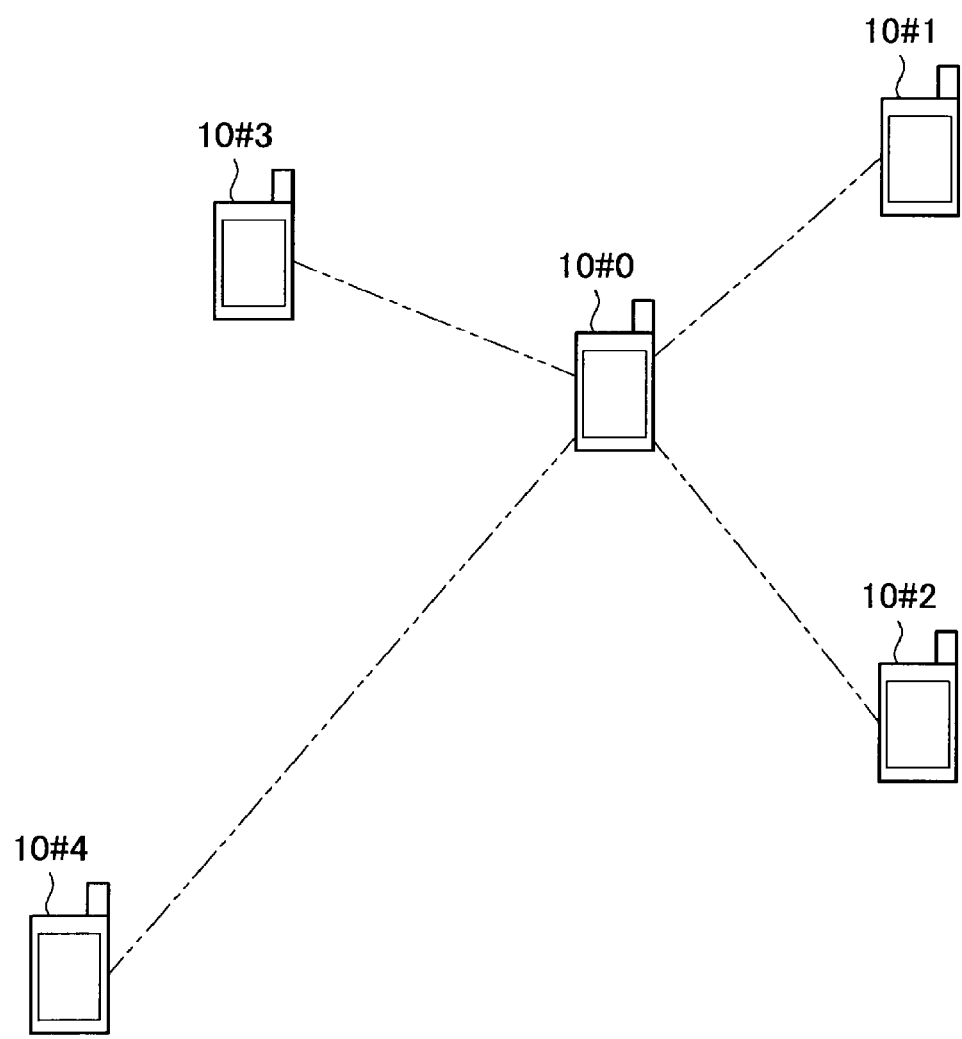
FIG. 1 is a diagram showing an example configuration of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in the present specification and the drawings, different numbers are attached to the end of the same reference number to distinguish a plurality of components having substantially the same functional configuration from each other in some cases. For example, a plurality of components having substantially the same function are distinguished, such as communication apparatuses 10#1 and 10#2, as necessary. However, when it is unnecessary to distinguish substantially the same functional configurations, only the same reference number is given thereto. For example, when it is not particularly necessary to distinguish the communication apparatuses 10#1 and 10#2 from each other, they are simply referred to as communication apparatuses 10.

The description will be given in the following order.
1. Overview of communication system according to one embodiment of present disclosure
2. First embodiment (code multiplexed ACK to space-division multiplexed frame)
3. Second embodiment (code multiplexed ACK to aggregation frame)
4. Third embodiment (frequency-division multiplexed ACK to multicast frame)
5. Fourth embodiment (frequency-division multiplexed ACK to frequency-division multiplexed frame)
6. Fifth embodiment (frequency-division multiplexed PS-poll to beacon frame)
7. Application examples
8. Conclusion

1. Overview of Communication System According to Embodiment of Present Disclosure Firstly, an overview of a communication system according to an embodiment of the present disclosure will be described with reference to FIG. 1. FIG. 1 is a diagram showing an example configuration of the communication system of the embodiment of the present disclosure.

The communication system is configured with a plurality of communication apparatuses 10. The communication apparatuses 10 have a wireless communication function and perform communication using multiplexing. Also, the communication apparatuses 10 operate as Access Points (APs) or terminals. Hereinafter, a communication apparatus operating as an AP will also be referred to as a master unit, and communication apparatuses operating as terminals will be referred to as slave units. For this reason, in the communication system, one-to-multiple communication using multiplexing is possible between the master unit and the slave units. Here, communication from the master unit to the slave units is referred to as downlink (DL) communication, and communication from the slave units to the master unit is referred to as uplink (UL) communication.

For example, as shown in FIG. 1, the communication system may include a plurality of communication apparatuses 10#0 to 10#4. The communication apparatus 10#0 which is a master unit and the communication apparatuses 10#1 to 10#4 which are slave units are connected through wireless communication and directly transmit and receive frames to and from each other. For example, the master unit 10#0 is a communication apparatus conforming to IEEE802.11ac, and performs space-division multiple access (SDMA) using an adaptive array antenna.

Here, in general, the slave unit that has received a DL frame from the master unit transmits an acknowledgment response to the DL frame to the master unit. For this reason, when the DL frame is transmitted to a plurality of slave units in the same time zone, the acknowledgment responses to the DL frame are transmitted to the master unit at the same timing, and the acknowledgment responses may collide. As a result, the acknowledgment responses are retransmitted, and the communication efficiency may decrease.

Figure 2:
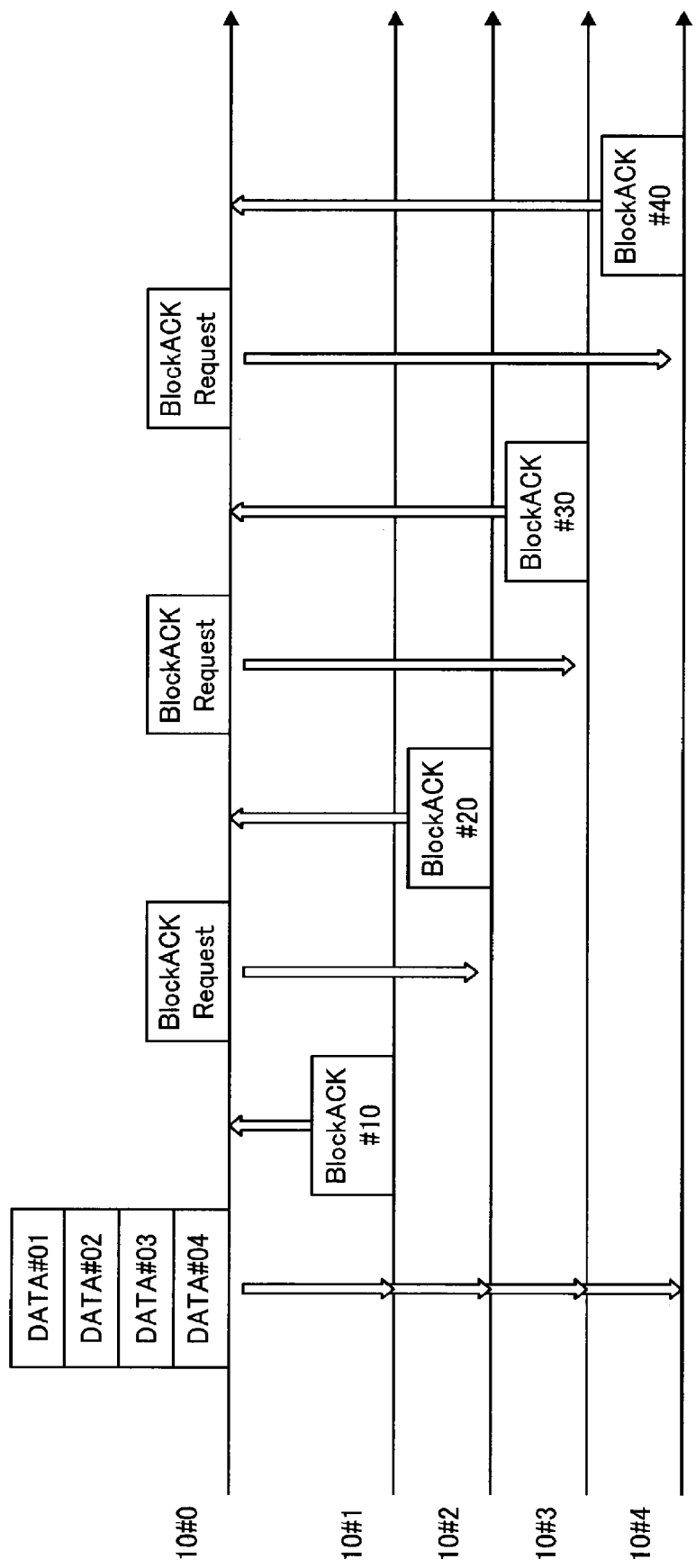
FIG. 2 is a diagram illustrating a sequence of an acknowledgment response to a multiplexed DL frame according to a related art.

On the other hand, in the 802.11ac standard, collision of the acknowledgment responses is prevented by performing sequential acknowledgment response communication with the communication apparatuses serving as the transmission destination of the DL frame. A process of transmitting an acknowledgment response to a multiplexed DL frame according to a related art will be described in detail with reference to FIG. 2. FIG. 2 is a diagram illustrating a sequence of an acknowledgment response to a multiplexed DL frame according to a related art.

First, the master unit simultaneously transmits a multiplexed frame to each of the slave units. For example, as illustrated in FIG. 2, a master unit 10#0 transmits multiplexed frames DATA #01 to DATA #04 to each of slave units 10#1 to 10#4.

Next, one of the slave units that have received the frame related to multiplexing transmits an acknowledgment response. For example, the slave unit 10#1 illustrated in FIG. 2 is permitted to transmit an acknowledgment response and thus transmits a block ACK when a predetermined time elapses after reception of DATA #01. None of the other slave units 10#2 to 10#4 transmits the block ACK. Therefore, a collision of the blocks ACK is prevented.

Next, when the acknowledgment response is received from one of the slave units, the master unit permits transmission of the acknowledgment response to a next slave unit, and the slave unit that has received the permission transmits the acknowledgment response. For example, as illustrated in FIG. 2, the master unit 10#0 transmits a block ACK request to the slave unit 10#2, and the slave unit 10#2 that has received the block ACK request transmits the block ACK. The permission of the acknowledgment response and the acknowledgment response are transmitted to the slave units.

As described above, the collision of the acknowledgment responses is prevented because communication of the acknowledgment response is performed sequentially for each slave unit. However, in this case, it takes time until the acknowledgment response communication for all the slave units is completed, and the communication efficiency may decrease.

In this regard, the present disclosure proposes a communication apparatus and a communication method capable of improving the communication efficiency while preventing collision of responses in communication of responses to frames transmitted to a plurality of communication apparatuses. Details thereof will be described below. Here, although an example of a communication system in which the communication apparatus 10#0 is a master unit is described in FIG. 1, another communication apparatus 10 may be a master unit, or the communication apparatus 10#0 may be a communication apparatus having a plurality of direct links with other communication apparatuses 10#1 to 10#4. In the latter case, the aforementioned UL may be replaced with "simultaneous transmission from one unit to a plurality of units," and the aforementioned UL may be replaced with "simultaneous transmission from a plurality of units to one unit." Also, for convenience of description, communication apparatuses 10 according to first to fifth embodiments are distinguished by attaching numbers corresponding to the embodiments to the ends thereof, such as a communication apparatus 10-1 and a communication apparatus 10-2.

2. First Embodiment (Code Multiplexed ACK to Space-Division Multiplexed Frame)

The overview of the communication system according to one embodiment of the present disclosure has been described above. Next, a communication apparatus 10-1 according to a first embodiment of the present disclosure will be described. In the present embodiment, a code sequence for multiplexing the acknowledgment response is designated in a frame exchange process related to a training signal, and the slave unit transmits the acknowledgment response using the designated code sequence.

2-1. Configuration of Communication Apparatus

Figure 3:
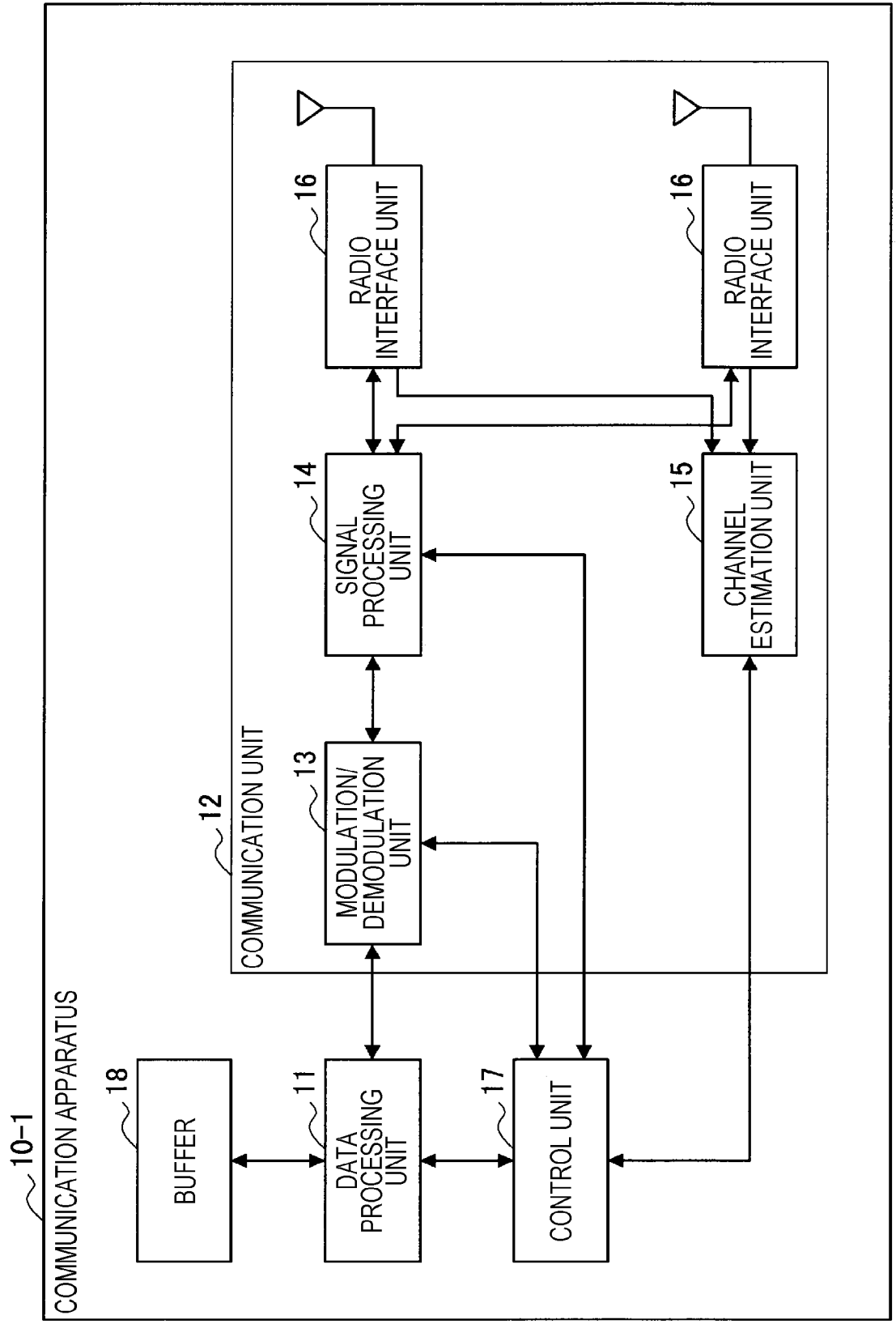
FIG. 3 is a block diagram illustrating a schematic functional configuration of a communication apparatus according to a first embodiment of the present disclosure.

Firstly, a configuration of the communication apparatus 10-1 according to the first embodiment of the present disclosure will be described with reference to FIG. 3. FIG. 3 is a block diagram schematically showing a functional configuration of the communication apparatus 10-1 of the first embodiment of the present disclosure.

As shown in FIG. 3, the communication apparatus 10-1 includes a data processing unit 11, a communication unit 12, a control unit 17, and a buffer 18. Firstly, basic functions of the communication apparatus 10-1 will be described.
((Basic Functions))

The data processing unit 11 performs a process for transmission and reception of data. Specifically, the data processing unit 11 generates a frame on the basis of data from a higher-level layer of communication, and provides the generated frame to a modulation/demodulation unit 13 described below. For example, the data processing unit 11 generates a frame (or packets) from data, and performs processes, such as addition of a MAC header for media access control (MAC), addition of an error detection code, and the like, on the generated frame. The data processing unit 11 also extracts data from a received frame, and provides the extracted data to a higher-level layer of communication. For example, the data processing unit 11 obtains data by performing, on a received frame, analysis of a MAC header, detection and correction of code error, a reordering process, and the like As shown in FIG. 3, the communication unit 12 includes a modulation/demodulation unit 13, a signal processing unit 14, a channel estimation unit 15, and radio interface units 16.

The modulation/demodulation unit 13 performs a modulation process and the like on a frame. Specifically, the modulation/demodulation unit 13 performs encoding, interleaving, and modulation on a frame provided by the data processing unit 11, in accordance with coding and modulation schemes and the like set by the control unit 17, to generate a symbol stream. Thereafter, the modulation/demodulation unit 13 provides the generated symbol stream to the signal processing unit 14. The modulation/demodulation unit 13 also performs demodulation and decoding or the like on the symbol stream provided by the signal processing unit 14 to obtain a frame, and provides the obtained frame to the data processing unit 11 or the control unit 17.

The signal processing unit 14 performs a process involved in space-division multiplex communication. Specifically, the signal processing unit 14 performs a signal process involved in space separation, on a symbol stream provided by the modulation/demodulation unit 13, and provides symbol streams obtained by the process to the respective radio interface units 16. The signal processing unit 14 also performs a spatial process, such as a symbol stream separation process or the like, on symbol streams obtained from the radio interface units 16, and provides a symbol stream obtained by the process to the modulation/demodulation unit 13.

The channel estimation unit 15 estimates a channel gain. Specifically, the channel estimation unit 15 calculates complex channel gain information from a preamble part or training signal part of a signal contained in the symbol stream obtained from the radio interface unit 16. Note that the calculated complex channel gain information is provided to the modulation/demodulation unit 13 and the signal processing unit 14 through the control unit 17, and is used in a modulation process and a space separation process or the like.

The radio interface unit 16, which includes an antenna, transmits and receives a signal through the antenna. Specifically, the radio interface unit 16 converts a signal contained in a symbol stream provided from the signal processing unit 14, into an analog signal, and performs amplification, filtering, and frequency upconversion on the analog signal. Thereafter, the radio interface unit 16 transmits the processed signal through the antenna. The radio interface unit 16 also performs, on a signal from the antenna, reverse processes to those which are performed for signal transmission, such as frequency downconversion, digital signal conversion, and the like, and provides the signal obtained by the processes to the channel estimation unit 15 and the signal processing unit 14.

Here, a slave unit may not include the signal processing unit 14, the channel estimation unit 15, and the two radio interface units 16. Also, the modulation/demodulation unit 13, the signal processing unit 14, the channel estimation unit 15, and the radio interface units 16 are collectively referred to as the communication unit 12.

The control unit 17 controls an overall operation of the communication apparatus 10-1. Specifically, the control unit 17 transfers information between each function, sets communication parameters, and schedules frames (or packets) in the data processing unit 11, for example.

A buffer 18 holds a frame. Specifically, in the buffer 18, frames generated by a data processing unit 11 are stored before they are transmitted, and frames received through a communication unit 12 are stored.

((Function at Time of Operation as Master Unit))

Next, a function when the communication apparatus 10-1 operates as the master unit will be described in detail.

(Response Separation Radio Resource Allocation Function)

A control unit 17 decides designation information designating different transmission processes for multiplexing for a plurality of slave units. Specifically, the control unit 17 allocates different codes for a plurality of slave units. More specifically, the control unit 17 allocates codes having a cross-correlation equal to or less than a correlation with a pseudo noise code to a plurality of slave units. For example, the control unit 17 allocates the following code sequence $C_n$ to the slave units serving as a communication target. Here, n indicates the number of slave units or a number corresponding to the slave unit.

$C_1$=(1, 1, 1, 1)
$C_2$=(1, 1, −1, −1)
$C_3$=(1, −1, 1, −1)
$C_4$=(1, −1, −1, 1)

The code sequence allocated to the slave unit (hereinafter, also referred to as a response code sequence) is not limited thereto, and various code sequences may be employed. Further, a length of the code sequence may be a length corresponding to the number of slave units to which the response code sequence is allocated or may be larger than a length corresponding to the number of slave units for the purpose of improvement in reliability.

The data processing unit 11 generates a frame indicating the designation information. Specifically, the data processing unit 11 generates a training signal request frame including information indicating the response code sequence. The information indicating the response code sequence may be the response code sequence itself or may be information specifying the response code sequence.

The communication unit 12 performs transmission and reception of frames related to channel training. Specifically, the communication unit 12 transmits the training signal request frame, for example, a training request (TRQ) frame, to the slave unit, and receives a training signal frame, for example, a training feedback (TFB) frame, from the slave unit. The communication unit 12 acquires an antenna weight on the basis of a reference signal included in the received TFB frame.

(DL Frame Transmission Processing Function)

The data processing unit 11 generates the DL frame. More specifically, the data processing unit 11 generates the DL frame destined for each of the slave units serving as the destination of the TRQ frame. The data processing unit 11 may generate the DL frame destined for each of the slave units that are transmission sources of the TFB frame.

The DL frame also includes response request information indicating a transmission request for the response to the DL frame. For example, the response request information may be stored in a MAC header of the DL frame or a physical layer convergence procedure (PLCP) header.

The communication unit 12 transmits the DL frame using space-division multiplex communication. Specifically, the communication unit 12 performs space-division multiplexing on the DL frame using the antenna weight obtained on the basis of the TFB frame, and transmits the resulting DL frame to each of the slave units.

(Response Reception Processing Function)

Figure 4A:
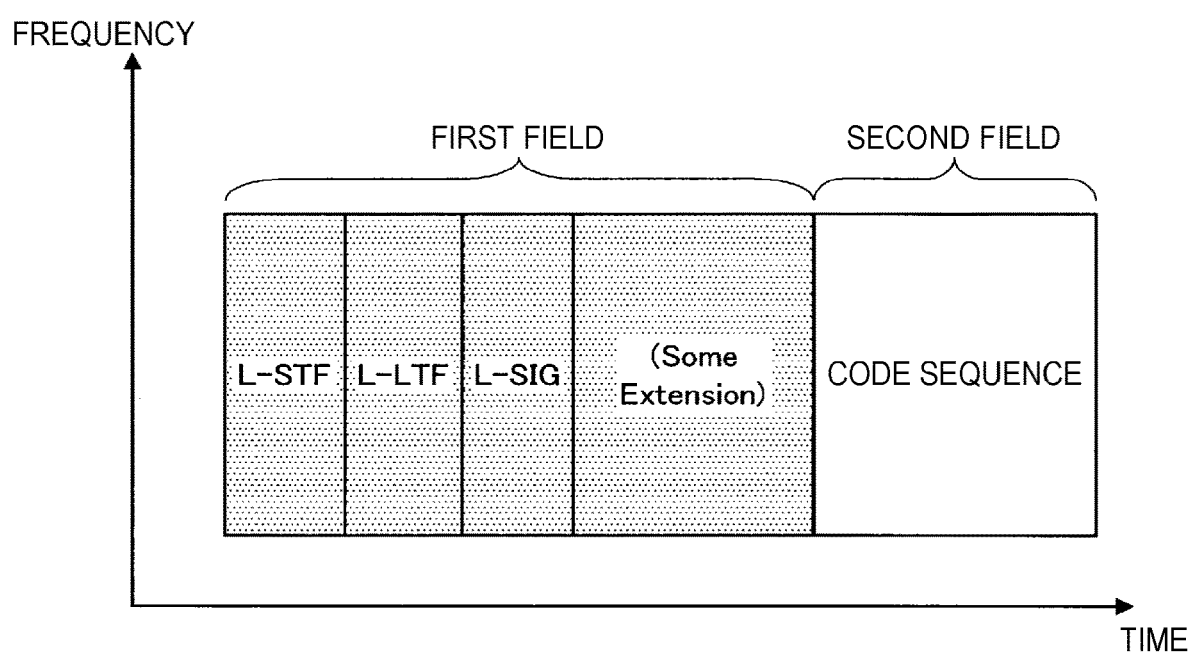
FIG. 4A is a diagram illustrating an example of a frame structure of an acknowledgment response transmitted by a slave unit according to the present embodiment.
Figure 4B:
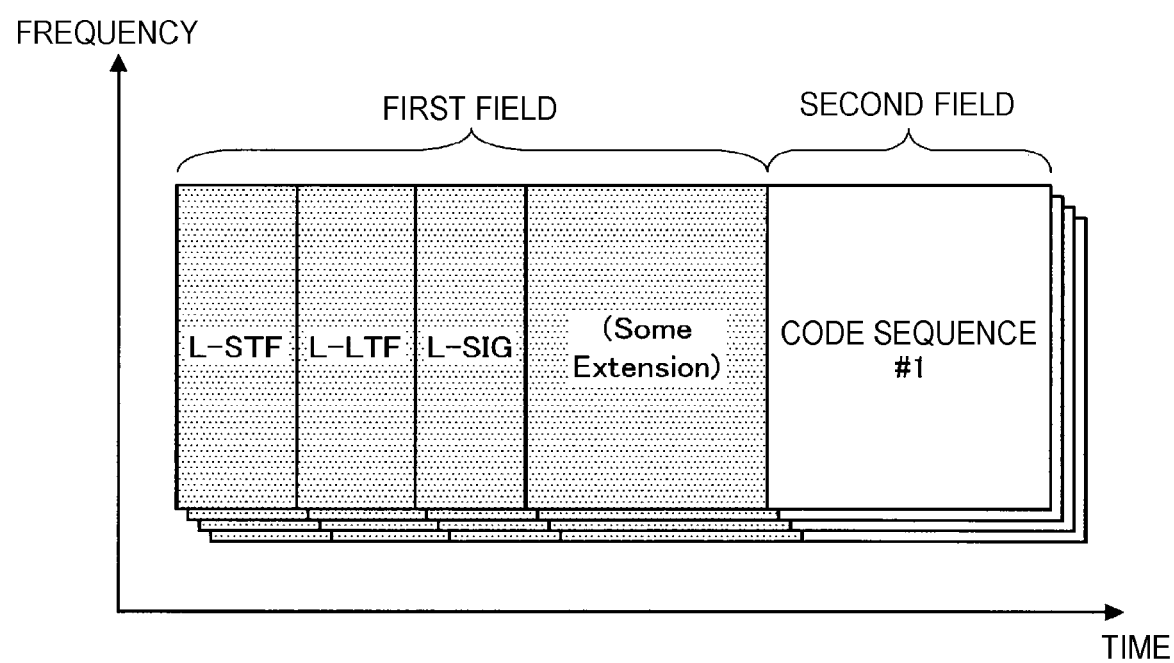
FIG. 4B is a diagram illustrating an example of a frame structure of an acknowledgment response transmitted by a slave unit according to the present embodiment.

The communication unit 12 receives the acknowledgment response from each of the slave units. Specifically, the communication unit 12 receives the multiplexed response to the DL frame indicating the designation information, and determines whether or not the response is received on the basis of the designation information. For example, as a part of the processing unit, the communication unit 12 determines whether or not the response is received on the basis of a result of correlation calculation between a code included in the response and a code allocated to each of a plurality of slave units. The response reception process will be described in detail with reference to FIGS. 4A and 4B. FIGS. 4A and 4B are diagrams illustrating an example of a frame structure of the acknowledgment response transmitted by the slave unit according to the present embodiment.

First, an acknowledgment response frame (hereinafter also referred to as an "ACK frame") includes a first field which is compatible with an existing standard and a second field in which response separation information is stored. For example, as illustrated in FIG. 4A, the first field includes a legacy short training field (L-STF), a legacy long training field (L-LTF), a legacy signal (L-SIG), and another data portion (some extension). The code sequence is stored in the second field.

The code sequence is expanded on a time axis. The code sequence may be expanded on a frequency axis. Here, the expansion on the frequency axis corresponds to expansion of the code sequence as information to be carried on each subcarrier component when orthogonal frequency-division multiplexing communication is performed. In both cases, since the redundancy of the second field is improved, it is not necessary to perform error correction coding on the second field.

Each of the ACK frames undergoes code-division multiplexing. For example, since each of the ACK frames transmitted from the slave unit is transmitted at the same frequency band in the same transmission period, the ACK frames are multiplexed as illustrated in FIG. 4B. Hatched portions in FIGS. 4A and 4B are portions common to the ACK frames, and a white background portion differs between the ACK frames.

Then, the communication unit 12 performs the reception process on the respective fields. For example, the communication unit 12 first performs the reception process on the first field conforming to the existing standard as usual. Then, the communication unit 12 performs a correlation calculation with each of the response code sequences for the second field. When the correlation between the code sequence of the second field and any one of the response code sequences is found to be a threshold value or more as a result of correlation calculation, for example, when an output amplitude is a threshold value or more, the communication unit 12 determines that the ACK frame is received from the slave unit to which the response code sequence is allocated.

((Function at Time of Operation as Slave Unit))

Next, a function when the communication apparatus 10-1 operates as the slave unit will be described in detail.

(Response Separation Radio Resource Allocation Function)

The communication unit 12 performs transmission and reception of frames related to channel training. Specifically, the communication unit 12 receives the training signal request frame from the master unit and transmits the training signal frame to the master unit.

The data processing unit 11 acquires the designation information from the training signal request frame. Specifically, the data processing unit 11 acquires information indicating a response code sequence related to its own apparatus from the TRQ frame. For example, the acquired response code sequence is stored in a separate storage unit in the slave unit.

(Response Transmission Processing Function)

The communication unit 12 receives the DL frame from the master unit and transmits the ACK frame to the master unit. Specifically, after the TFB frame is transmitted, the communication unit 12 receives the DL frame from the master unit. Then, the communication unit 12 transmits the ACK frame generated by the data processing unit 11 to the master unit when a predetermined time elapses after the DL frame is received.

The predetermined time is shared by the master unit and all the slave units. Preferably, the predetermined time is a time in which transmission from a communication apparatus of a third party is not performed. For example, the predetermined time may be a short inter frame space (SIFS) or a PCF inter frame space (PIFS).

The predetermined time may be dynamically changed. For example, the control unit 17 of the master unit decides the predetermined time, and the data processing unit 11 includes information indicating the predetermined time in the DL frame. The communication unit 12 of the slave unit transmits the ACK frame to the DL frame after the predetermined time indicated by the information included in the received DL frame elapses. In this case, the shared predetermined time is dynamically changed, and thus it is possible to flexibly deal with a change in a communication specification or a change in a communication state.

Further, the communication unit 12 may not perform carrier sense when the ACK frame is transmitted. This is because transmission from the communication apparatus of the third party is not performed during the predetermined time.

The data processing unit 11 generates the ACK frame. Specifically, when the DL frame is received from the master unit, the data processing unit 11 generates the ACK frame to the DL frame. For example, the data processing unit 11 generates the ACK frame including the first field conforming to the existing standard and the second field composed of response code sequence acquired from the storage unit.

2-2. Process by Communication Apparatus

Next, a process of the communication system and the communication apparatus 10-1 according to the present embodiment will be described with reference to FIG. 5 and FIGS. 6 to 9. FIG. 5 is a diagram illustrating an example of a frame exchange sequence according to the present embodiment.

(Overall Process)

Figure 6:
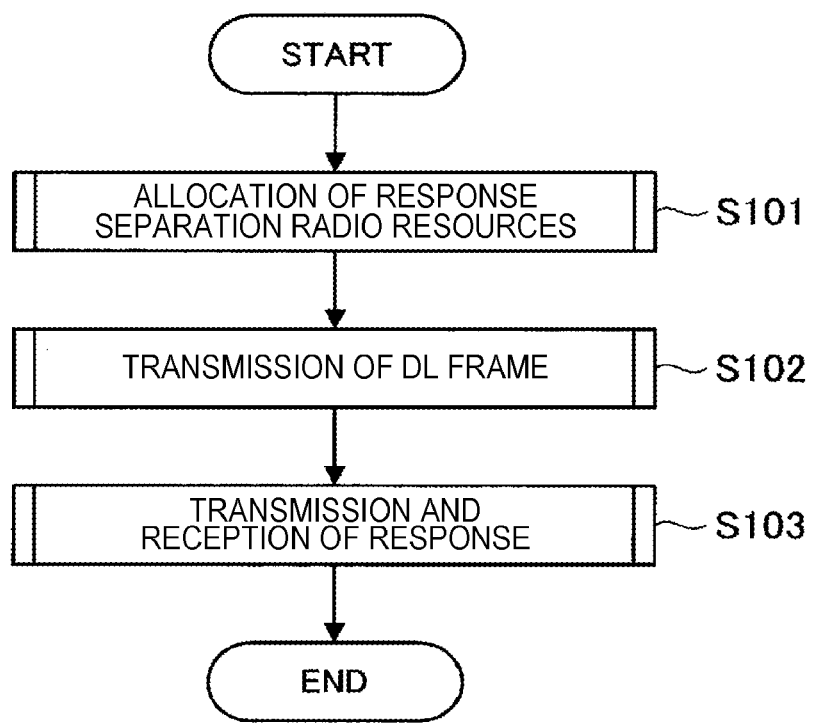
FIG. 6 is a flowchart conceptually showing processing of the communication system according to the present embodiment.

First, the flow of processing of the communication system will be described with reference to FIG. 6. FIG. 6 is a flowchart conceptually showing processing of the communication system according to the present embodiment.

First, in an information system, a response separation radio resource allocation process is performed (step S101). Specifically, a frame indicating the designation information is transmitted from the master unit to the slave unit, and a frame serving as a response to the frame is transmitted from the slave unit to the master unit. For example, the TRQ frame and the TFB frame are exchanged between a master unit 10-1#0 and each of slave units 10-1#1 to 10-1#4 as illustrated in FIG. 5. The TRQ/TFB frame exchange process may be performed as a part of an RTS/CTS frame exchange process.

Then, in the information system, a DL frame transmission process is performed (step S102). Specifically, a multiplexed frame is transmitted from the master unit to each of the slave units. For example, multiplexed data frames DATA #01 to #04 as illustrated in FIG. 5 are transmitted from the master unit 10-1#0 to the slave units 10-1 to 10-1#4.

Then, in the information system, a process of transmitting and receiving the response to the DL frame is performed (step S103). Specifically, a response frame is transmitted from each of the slave units to the master unit. For example, as illustrated in FIG. 5, the ACK frame is transmitted from the slave units 10-1#1 to 10-1#4 at the same timing, and the ACK frames multiplexed as a result are received by the master unit 10-1#0.

(Response Separation Radio Resource Allocation Process and DL Frame Transmission Process)

Figure 7:
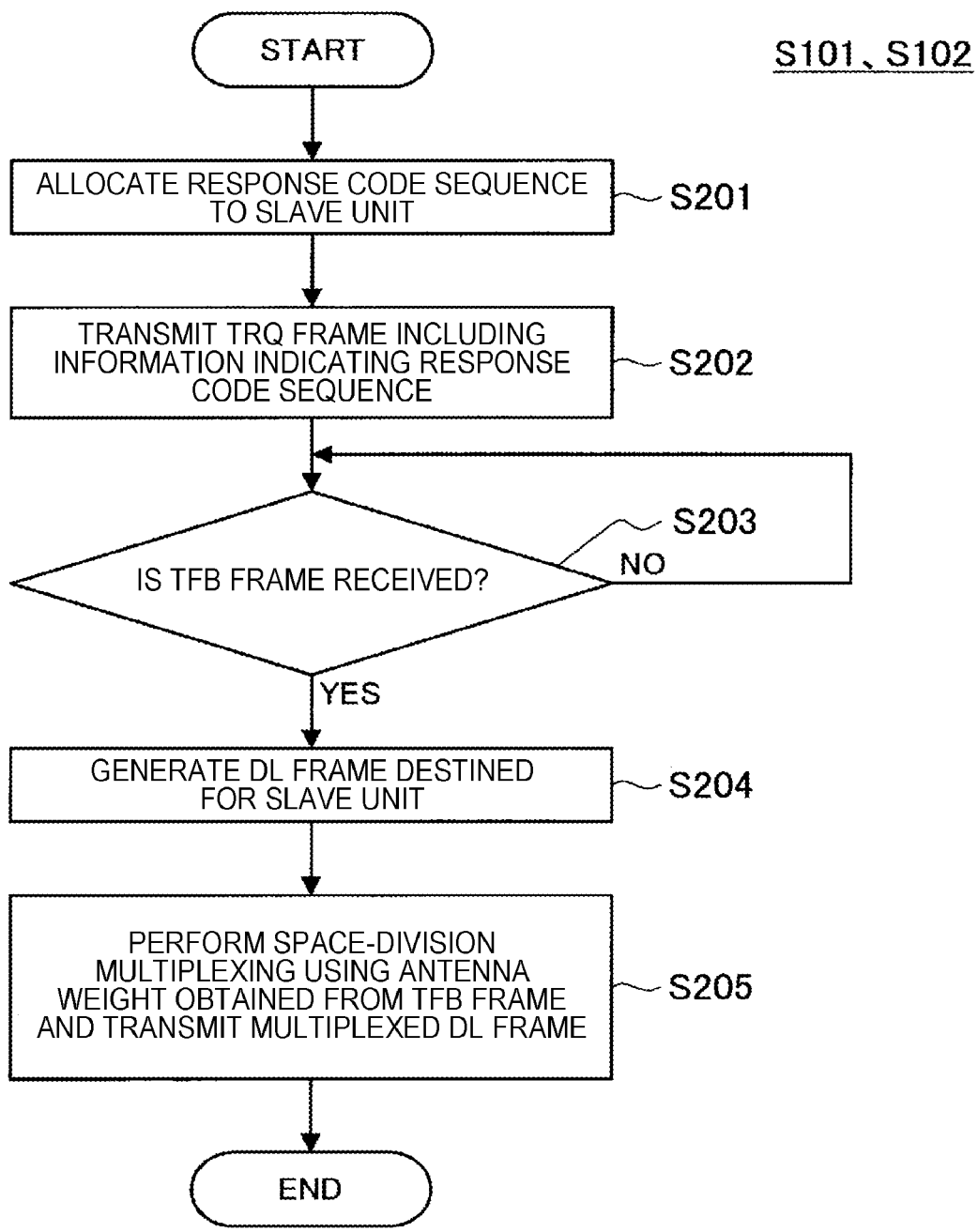
FIG. 7 is a flowchart conceptually illustrating a response separation radio resource allocation process and a DL frame transmission process of a master unit according to the present embodiment.

Next, the response separation radio resource allocation process and the DL frame transmission process of the master unit will be described with reference to FIG. 7. FIG. 7 is a flowchart conceptually illustrating the response separation radio resource allocation process and the DL frame transmission process of the master unit according to the present embodiment.

First, the master unit allocates the response code sequence to the slave unit (step S201). Specifically, the control unit 17 specifies the slave units serving as a communication target and allocates different response code sequences to the specified slave units.

Then, the master unit transmits the TRQ frame including information indicating the response code sequence to the slave unit (step S202). Specifically, the data processing unit 11 generates the TRQ frame including the information indicating the response code sequence allocated to each of the slave units by the control unit 17 for each of the slave units of the destination. Then, the communication unit 12 transmits the generated TRQ frame to the slave unit.

Then, the master unit is on standby until the TFB frame is received (step S203). Further, when the TFB frame is not received within a predetermined time after the transmission of the TRQ frame, the TRQ frame may be retransmitted.

When the TFB frame is received, the master unit generates the DL frame destined for the slave unit (step S204). Specifically, when the TFB frame is received, the communication unit 12 acquires the antenna weight on the basis of the reference signal of the TFB frame. Then, the data processing unit 11 generates the DL frame including the response request information for each of the slave units of the communication target.

Then, the master unit performs space-division multiplexing on the DL frame using the antenna weight obtained from the TFB frame, and transmits the multiplexed DL frame (step S205). Specifically, the communication unit 12 performs space multiplexing on each of the generated DL frames using the antenna weight acquired on the basis of the reference signal of the TFB frame, and transmits the multiplexed DL frame to each of the slave units.

(Response Transmission Process)

Figure 8:
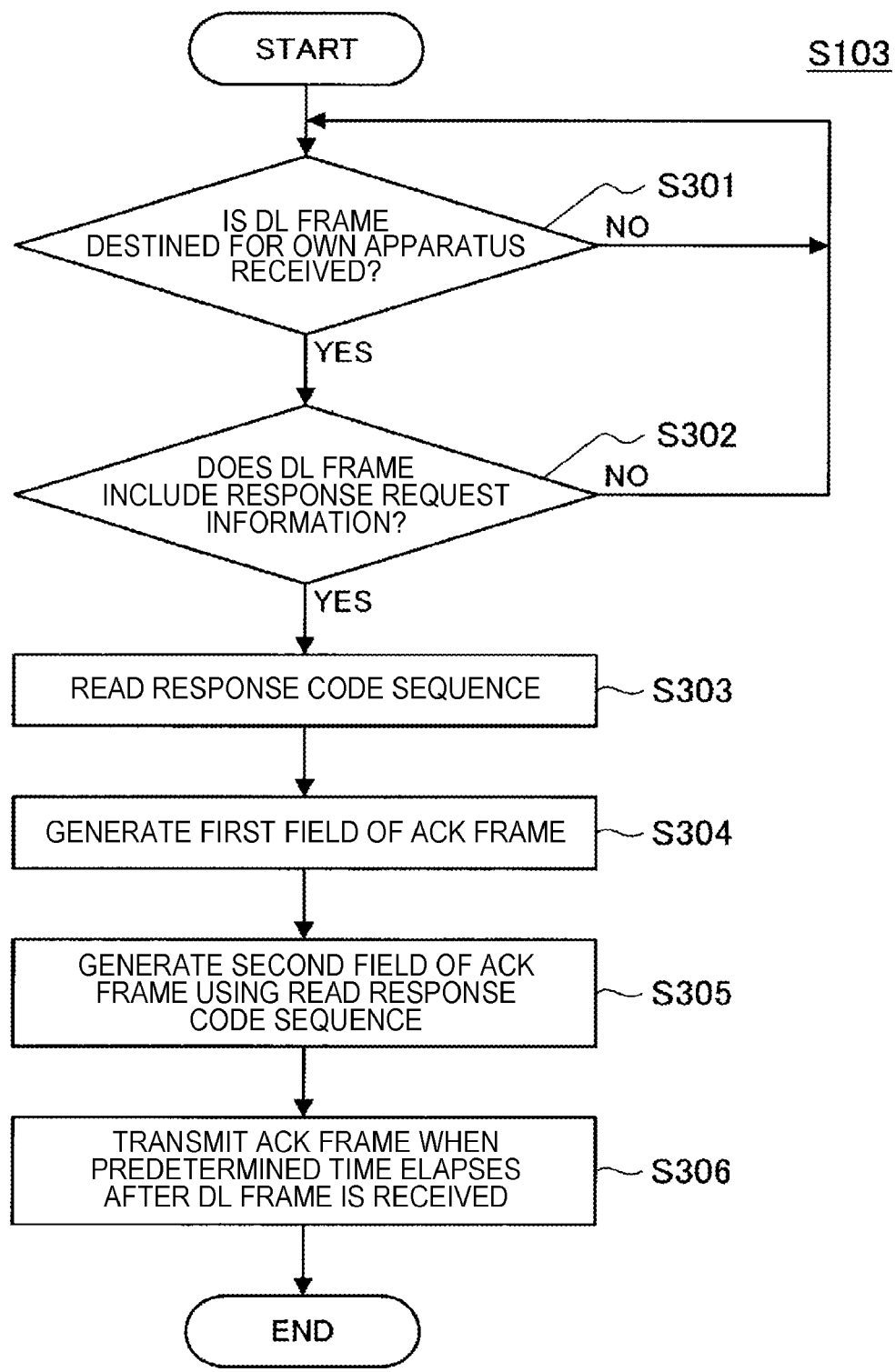
FIG. 8 is a flowchart conceptually illustrating a response transmission process of a slave unit according to the present embodiment.

Next, the response transmission process will be described with reference to FIG. 8. FIG. 8 is a flowchart conceptually illustrating the response transmission process of the slave unit according to the present embodiment.

First, the slave unit determines whether the DL frame destined for its own apparatus is received (step S301). Specifically, when the DL frame is received, the communication unit 12 corrects a frequency offset of a reference oscillator for the master unit using a signal in a preamble of the DL frame (a PLCP preamble or the like). This is because, if the frequencies of the master unit and the slave unit do not match, it may be difficult to correctly extract a signal from a received transmission wave. Then, the data processing unit 11 determines whether or not the destination of the DL frame is its own apparatus.

When the DL frame destined for its own apparatus is determined to be received, the slave unit determines whether or not the DL frame includes the response request information (step S302). Specifically, the data processing unit 11 determines whether or not the response request information is included in the header of the DL frame. Further, when the response request information is not included in the DL frame, the slave unit is on standby until a notification of the response request is separately given, similarly to the related art.

If the DL frame is determined to include the response request information, the slave unit reads the response code sequence (step S303). Specifically, when the destination of the DL frame is determined to be its own apparatus, the data processing unit 11 performs the DL frame reception process. Further, the data processing unit 11 reads the information indicating the response code sequence stored in the storage unit.

The slave unit generates the first field of the ACK frame (step S304). Specifically, the data processing unit 11 generates the first field of the ACK frame conforming to the existing standard.

Then, the slave unit generates the second field of the ACK frame using the read response code sequence (step S305). Specifically, the data processing unit 11 stores the response code sequence read from the storage unit in the second field of the ACK frame.

Then, the slave unit transmits the ACK frame when a predetermined time elapses after the DL frame is received (step S306). Specifically, the communication unit 12 transmits the ACK frame including the first feed and the second field generated by the data processing unit 11 to the master unit when a predetermined time elapses after the DL frame is received. Since the predetermined time is the same as those of other slave units, the ACK frames are consequently multiplexed.

(Response Reception Process)

Figure 9:
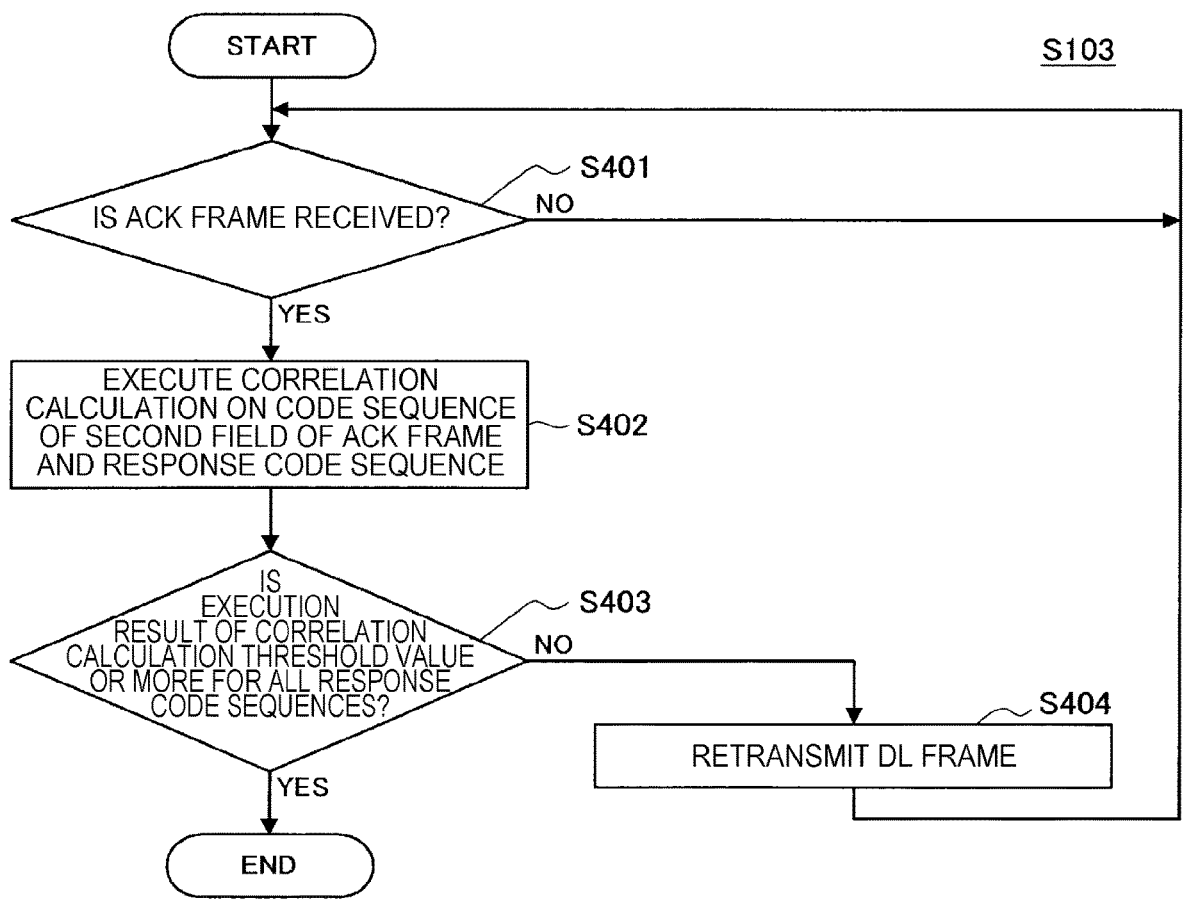
FIG. 9 is a flowchart conceptually illustrating a response reception process of a master unit according to the present embodiment.

Next, the response reception process of the master unit will be described with reference to FIG. 9. FIG. 9 is a flowchart conceptually illustrating the response reception process of the master unit according to the present embodiment.

First, the master unit is on standby until the ACK frame is received (step S401). Specifically, the communication unit 12 detects the reception of the ACK frame by receiving the first field of the ACK frame.

Upon receiving the ACK frame, the master unit executes the correlation calculation on the code sequence of the second field of the ACK frame and the response code sequence (step S402). Specifically, after the reception process of the first field of the received ACK frame is performed, the communication unit 12 executes the correlation calculation on the code sequence of the second field and each of the response code sequences used for allocation.

Then, the master unit determines whether an execution result of the correlation calculation is a threshold value or more for all the response code sequences (step S403). Specifically, the communication unit 12 determines whether the output amplitude obtained by the correlation calculation between the second field and the response code sequence used for the allocation is a threshold value or more.

When the result found by executing the correlation calculation is less than the threshold value for any one of the response code sequences, the master unit retransmits the DL frame to the slave unit (step S404). Specifically, when the output amplitude obtained through the correlation calculation is determined to be less than a threshold value, the communication unit 12 retransmits the DL frame to the slave unit to which the code sequence is allocated. This is because the transmission of the DL frame to the slave unit to which the response code sequence is allocated is estimated to have failed.

As described above, according to the first embodiment of the present disclosure, the master unit generates the frame indicating the designation information designating different transmission processes for multiplexing for a plurality of slave units, and transmits the generated frame to a plurality of slave units. Further, the slave unit performs the process of receiving the frame from the master unit, and processes the response to the frame in accordance with the transmission process which is indicated from the master unit and differs for each the slave unit. Therefore, since the responses to the frames transmitted to the slave units are multiplexed on the basis of the designation information, it is possible to improve the communication efficiency while preventing the collision of the responses.

Further, the designation information is a code allocated to each of a plurality of slave units. Thus, since the responses from the slave units are multiplexed using the codes, it is possible to improve the communication efficiency without performing complicated signal processing or the like, similarly to the case in which the responses are multiplexed by a frequency.

Further, the cross-correlation between the above code and the code allocated to each of a plurality of slave units is a correlation with the pseudo noise code or less. Therefore, since orthogonality between codes is secured, it is possible to suppress the occurrence of erroneous code detection.

Further, the codes are chronologically arranged so that the codes arranged at respective use frequencies are the same in the same period, or the codes are arranged in a frequency sequence so that the codes arranged at respective transmission times at the same frequency are the same. For this reason, it is possible to improve the redundancy of the code sequence by arranging the same code sequence on the time axis or the frequency axis.

Further, the frame indicating the above the designation information includes the training signal request frame. Therefore, when the existing TRQ/TFB frame exchange process is used, it is not necessary to separately provide the designation information to the slave unit via new separate communication, and it is possible to improve the communication efficiency.

Further, when a predetermined time elapses after the frame indicating the designation information is received, the master unit receives the multiplexed response transmitted from a plurality of other communication apparatuses in response to the frame indicating the designation information, and determines whether or not the response is received on the basis of the designation information. Therefore, even when the responses are multiplexed, it is determined whether or not the response is received for each slave unit, and the frame is retransmitted only to slave units from which the response is not received, and thus it is possible to prevent the communication efficiency from deteriorating. Further, since the transmission periods of the responses transmitted from by the slave units are identical, the responses are multiplexed, and thus it is possible to terminate the response process early.

The master unit performs the above determination on the basis of the result of correlation calculation between the code included in the response and the code allocated to each of a plurality of slave units. Thus, it is possible to simplify the response reception determination process since it is determined whether or not the responses are received without separating the multiplexed responses.

Further, the frame indicating the above the designation information includes the response request information indicating the response transmission request. In the past, only one of the slave units could transmit the response after the DL frame was received, and the other slave units did not transmit the acknowledgment response until the response request was separately received from the master unit, and thus it took time until transmission and reception of the response were completed. However, according to the present embodiment, since the responses are transmitted from all the slave units after the DL frame is received, it is possible to reduce a time taken for transmission and reception of the response, improve the communication efficiency, and suppress the power consumption in the slave unit.

2-3. Variations

The first embodiment of the present disclosure has been described above. Note that this embodiment is not limited to the above examples. Variations of the first and second embodiments will now be described.

First Modified Example

As a first modified example of the present embodiment, the response to the DL frame may be modulated by a modulation scheme common to the slave units. Specifically, the communication unit 12 of the slave unit modulates the response to the DL frame on the basis of information indicating a modulation scheme included in the DL frame.

For example, in the master unit, the data processing unit 11 includes the information indicating the modulation scheme in the DL frame, and the communication unit 12 transmits the DL frame to the slave unit. The modulation scheme indicated by the information is common to the slave units.

In the slave unit, the data processing unit 11 acquires the information indicating the modulation scheme included in the received DL frame, and the communication unit 12 modulates the response using the modulation scheme indicated by the acquired information when the response to the DL frame is transmitted.

As described above, according to the first modified example of the present embodiment, the response to the DL frame is modulated by the modulation scheme common to the slave units. Thus, the transmission period length of the responses transmitted by the slave units is the same, a fluctuation in the number of multiplexed responses is suppressed during the response transmission period, and it is possible to stabilize the reception performance of the master unit that receives the responses.

The example in which the information indicating the modulation scheme is included in the DL frame has been described above, but the communication unit 12 of each of the slave units may use a fixed modulation scheme. For example, the communication unit 12 may use a modulation scheme whose modulation rate is slower than other modulation schemes. Further, the communication unit 12 of each of the slave units may use a modulation scheme specified on the basis of a modulation scheme used for modulation of the DL frame. For example, the communication unit 12 may use a modulation scheme uniquely specified from a modulation scheme used for modulation of the DL frame. In this case, since the modulation scheme is shared by the slave units without adding new information to the DL frame, it is possible to prevent the wireless communication resources from being consumed for commonization of the modulation scheme.

Second Modified Example

As a second modified example of the present embodiment, transmission power used for transmitting the response in the slave unit may be controlled. Specifically, the data processing unit 11 of the master unit includes information designating the transmission power in the DL frame.

For example, in the master unit, the data processing unit 11 includes the information designating the transmission power used for the transmission of the ACK frame in the slave unit in the DL frame. Then, the communication unit 12 transmits the DL frame generated by the data processing unit 11. The information designating the transmission power may be information indicating a value of the transmission power or a difference value with a previously designated value or information indicating a difference value with transmission power in communication which is previously performed.

In the slave unit, when the DL frame including the information designating the transmission power is received, the data processing unit 11 sets the transmission power in accordance with the information included in the DL frame. Then, the communication unit 12 transmits the ACK frame to the master unit using the set transmission power.

As described above, according to the second modified example of the present embodiment, the data processing unit 11 of the master unit includes the information designating the transmission power in the DL frame. Therefore, when the transmission powers of the slave units are different, it is possible to prevent a situation in which the transmission waves with smaller transmission power than other slave units are weakened by the transmission waves of the other slave units and the communication quality of the ACK frame decreases.

The example in which the information designating the transmission power is included in the DL frame has been described above, but the information may be included in any other frame which is transmitted in advance. For example, the information designating the transmission power may be included in the TRQ frame.

Although an example in which a master unit designates transmission power has been described above, a slave unit may control transmission power even when no designation of transmission power is performed by the master unit. For example, the control unit 17 estimates propagation loss of transmission waves on the basis of previously acquired information on reception power at the master unit. Here, the reception power information may be included in a DL frame. Subsequently, the control unit 17 sets transmission power on the basis of the estimated propagation loss so that reception power at the master unit side becomes a predetermined value. Thereafter, the communication unit 12 transmits a ACK frame to the master unit using the set transmission power. In this case, communication for designating transmission power is not performed, and it is possible to use wireless communication resources for other purposes or uses.

3. Second Embodiment (Code Multiplexed ACK to Aggregation Frame)

The communication apparatus 10-1 according to the first embodiment of the present disclosure has been described above. Next, a communication apparatus 10-2 according to a second embodiment of the present disclosure will be described. A DL frame according to the present embodiment is an aggregation frame including a plurality of frames having different destinations.

3-1. Configuration of Communication Apparatus

The communication apparatus 10-2 has substantially the same functional configuration as that of the first embodiment, except for a portion of the functions of the data processing unit 11 and the communication unit 12. Note that substantially the same functions as those of the first embodiment will not be described.
((Function at Time of Operation as Master Unit))
First, a function when the communication apparatus 10-2 operates as a master unit will be described. In the present embodiment, the response separation radio resource allocation and the DL frame transmission process are performed together.
(Response Separation Radio Resource Allocation Function and DL Frame Transmission Processing Function)

The data processing unit 11 generates the DL frame including a plurality of frames. Specifically, the data processing unit 11 generates the DL frame configured with frames which are temporally combined and destined for a plurality of slave units. For example, the data processing unit 11 generates a frame including information indicating different code sequences allocated to the slave units by the control unit 17. Then, the data processing unit 11 generates the DL frame which is an aggregation frame by connecting the generated frames of the respective slave units.

Further, similar to the first embodiment, the DL frame includes the response request information indicating that the response to the DL frame is permitted, but the response request information may be included in the header of the frame destined for each of the slave units, for example, in the MAC header. Further, the response request information may be included in the header of the DL frame, for example, in the PLCP header.

The communication unit 12 transmits the generated DL frame. Specifically, unlike the first embodiment, the communication unit 12 transmits the DL frame to each of the slave units without multiplexing the DL frames.
(Response Reception Processing Function)

Since the reception process for the response to the DL frame is substantially the same as in the first embodiment, description is omitted.
((Function at Time of Operation as Slave Unit))

Next, a function when the communication apparatus 10-2 operates as the slave unit will be described. In the present embodiment, the response separation radio resource allocation and the response transmission process are performed together.
(Response Separation Radio Resource Allocation Function and Response Transmission Processing Function)

The data processing unit 11 acquires the designation information from the DL frame including a plurality of frames. Specifically, the data processing unit 11 determines whether a frame destined for its own apparatus is included in the DL frame. When a frame destined for its own apparatus is determined to be included in the DL frame, the data processing unit 11 acquires the information indicating the code sequence from the frame destined for its own apparatus.
(Response Transmission Processing Function)

Since the transmission process for the response to the DL frame is substantially the same as in the first embodiment, description is omitted.

3-2. Process of Communication Apparatus

Next, a process of the communication apparatus 10-2 according to the present embodiment will be described. The flow of a process of the communication apparatus 10-2 according to the present embodiment is substantially the same as the flow of the process according to the first embodiment except that the TRQ/TFB frame exchange process is omitted, and the radio resource allocation is performed by the DL frame. Therefore, only the flow of the process of the information system according to the present embodiment will be described with reference to FIG. 10. FIG. 10 is a diagram illustrating an example of a frame exchange sequence according to the present embodiment.

(Overall Process)

First, in the information system, the response separation radio resource allocation and the DL frame transmission process are performed (steps S101 and S102). Specifically, the DL frame generated by connecting the frames destined for the slave units is transmitted from the master unit to each of the slave units. For example, data frames DATA #01 to #04 destined for the slave units as illustrated in FIG. 10 are connected to generate the DL frame. Then, the DL frame is transmitted from a master unit 10-2#0 to slave units 10-2#1 to 10-2#4.

Then, in the information system, a process of transmitting and receiving the response to the DL frame is performed (step S103). Specifically, the response frame is transmitted from each of the slave units that have received the DL frame to the master unit. For example, as illustrated in FIG. 10, the ACK frame is transmitted from each of the slave units 10-2#1 to 10-2#4 that have received the DL frame at the same timing, and the ACK frames multiplexed as a result are received by the master unit 10-2#.

As described above, according to the second embodiment of the present disclosure, the DL frame indicating the designation information includes a frame configured with frames which are temporally combined and destined for a plurality of slave units. For this reason, the DL frame is transmitted to a plurality of slave units at the same timing without being multiplexed, and thus signal processing related to multiplexing is omitted, and it is possible to simplify a process and a configuration related to communication of the master unit.

4. Third Embodiment (Frequency-Division Multiplexed ACK to Multicast Frame)

The communication apparatus 10-2 according to the second embodiment of the present disclosure has been described above. Next, a communication apparatus 10-3 according to a third embodiment of the present disclosure will be described. A DL frame according to the present embodiment is a multicast frame destined for a plurality of slave units. Further, the response to the DL frame according to the present embodiment undergoes frequency-division multiplexing.

4-1. Configuration of Communication Apparatus

The communication apparatus 10-3 has substantially the same functional configuration as that of the first and second embodiments, however, a portion of the functions of the data processing unit 11, the communication unit 12, and the control unit 17 is different from the one of the second embodiment. Note that substantially the same functions as those of the first or second embodiment will not be described.

((Basic Functions))

The modulation/demodulation unit 13 and the signal processing unit 14 in the communication unit 12 perform a process involved in frequency-division multiplexing. Specifically, the modulation/demodulation unit 13 divides a frame provided from the data processing unit 11 into portions, the number of which is equal to the number of subcarriers, and modulates each portion of the frame obtained by the division. Thereafter, the modulation/demodulation unit 13 combines signals obtained by the modulation, and provides the signal obtained by the combination to the signal processing unit 14. The signal processing unit 14 performs a process, such as addition of a guard interval, or the like, on the signal provided from the modulation/demodulation unit 13, and provides a signal obtained by the process, i.e., a symbol stream, to the radio interface unit 16.

The signal processing unit 14 performs a process, such as removal of a guard interval, or the like, on the symbol stream related to received waves provided from the radio interface unit 16, and provides a signal obtained by the process to the modulation/demodulation unit 13. The modulation/demodulation unit 13 extracts a subcarrier signal from the signal provided from the signal processing unit 14, and demodulates each subcarrier. Thereafter, the modulation/demodulation unit 13 combines frames obtained by the demodulation, and provides the combined frame to the data processing unit 11.

((Function at Time of Operation as Master Unit))

Next, a function when the communication apparatus 10-3 operates as a master unit will be described.

(Response Separation Radio Resource Allocation Function and DL Frame Transmission Processing Function)

The control unit 17 allocates a different frequency (hereinafter, also referred to as a "response frequency") to each of a plurality of slave units. For example, the control unit 17 allocates the following frequencies $f_n$ to the slave units serving as a communication target. Here, n indicates the number of slave units or a number corresponding to the slave unit.

$F_1$=5190 to 5195 MHz
$F_2$=5195 to 5200 MHz
$F_3$=5200 to 5205 MHz
$F_4$=5205 to 5210 MHz

The allocation of the response frequency is not limited thereto, and various allocations may be adopted.

The data processing unit 11 generates a DL frame that is configured with one frame and indicates the designation information. Specifically, the data processing unit 11 generates a multicast frame destined for a plurality of slave units. For example, the data processing unit 11 generates a DL frame that includes information indicating the response frequency and is configured with one frame. Then, the data processing unit 11 sets each of the slave units as the destination of the DL frame. The information indicating the response frequency may be stored in the header of the DL frame, for example, in the MAC header or the PLCP header. Similarly to the first and second embodiments, the DL frame includes the response request information in the header or the like.

The communication unit 12 transmits the DL frame. Specifically, similarly to the second embodiment, the communication unit 12 transmits one generated DL frame to each of the slave units.

(Response Reception Processing Function)

Figure 11A:
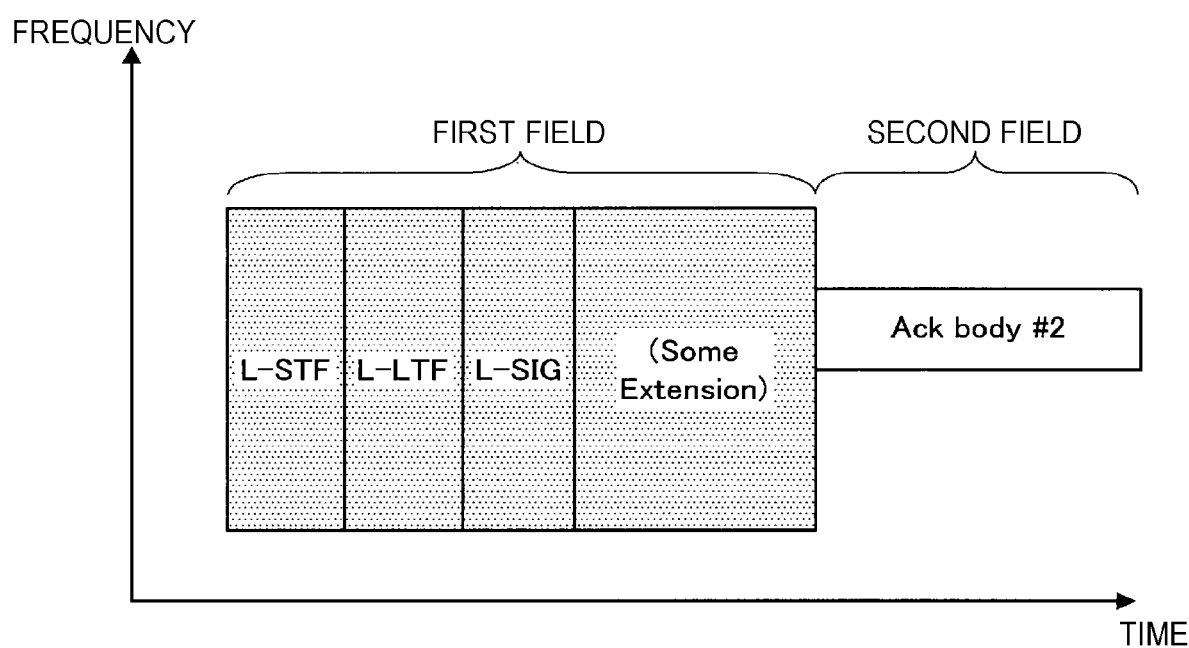
FIG. 11A is a diagram illustrating an example of a frame structure of an acknowledgment response transmitted by a slave unit according to a third embodiment of the present disclosure.
Figure 11B:
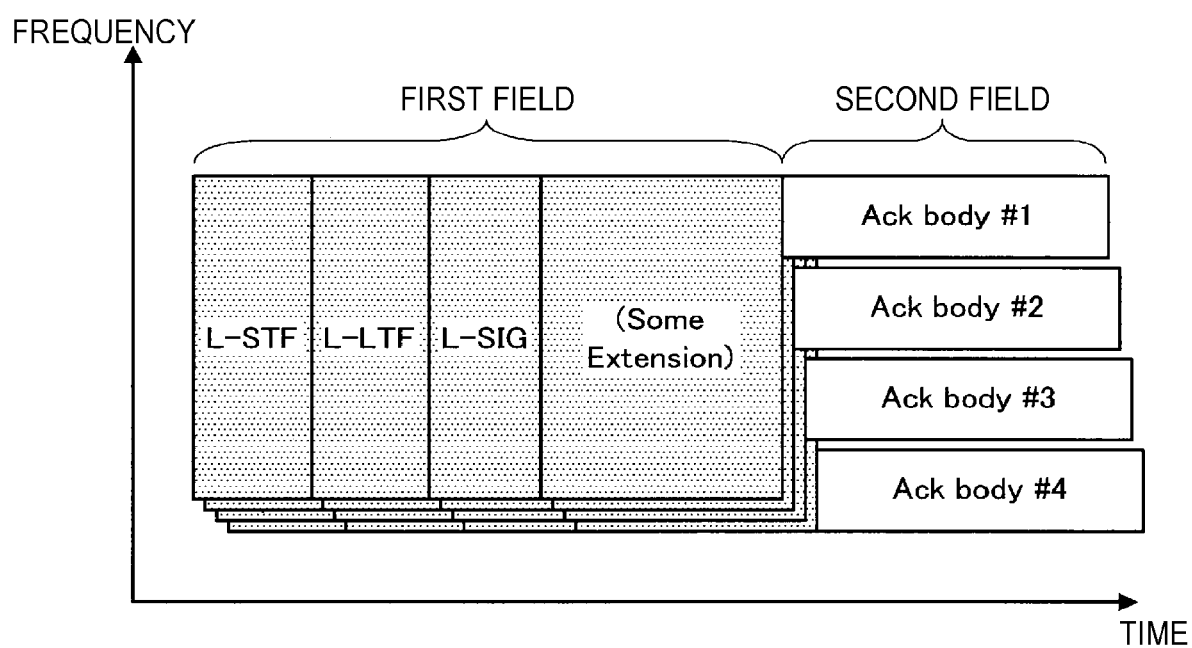
FIG. 11B is a diagram illustrating an example of a frame structure of an acknowledgment response transmitted by a slave unit according to the present embodiment.

The communication unit 12 performs the reception process for a frequency-division multiplexed response. Specifically, the communication unit 12 determines whether or not the response is received on the basis of whether or not the received response includes a signal of the response frequency allocated to each of a plurality of slave units. The response reception process will be described in detail with reference to FIGS. 11A and 11B. FIGS. 11A and 11B are diagrams illustrating an example of a frame structure of an acknowledgment response transmitted by the slave unit according to the present embodiment.

First, each of the ACK frames is configured with a first field which is compatible with the existing standard and a second field in which response content is stored. For example, as illustrated in FIG. 11A, the first field is configured with the L-STF, the L-LTF, the L-SIG other data portions, and the like, similarly to the first embodiment. The response content is stored in the second field. The response content may be a signal of an arbitrary pattern.

The second field is expanded on the response frequency allocated to the slave unit serving as the transmission source of the acknowledgment response. For example, as illustrated in FIG. 11A, the first field uses the entire usable frequency band, whereas the second field uses a part of the frequency band.

Each of the ACK frames undergoes frequency-division multiplexing. For example, since each of the ACK frames transmitted from the slave units is transmitted in the same transmission period and the second field is expanded on the response frequency allocated to each of the slave units, the second fields of the ACK frames are multiplexed so that they are arranged on the frequency axis as illustrated in FIG. 11B.

The communication unit 12 that receives the ACK frame that is frequency-division multiplexed performs the process of receiving the respective fields. For example, the communication unit 12 first performs the reception process on the first field conforming to the existing standard as usual. Then, for the second field, the communication unit 12 analyzes an amplitude of a frequency component of the response frequency used for allocation to the slave unit. When the amplitude of the frequency component of the allocated response frequency is found to be a threshold value or more as a result of analysis, the communication unit 12 determines that the ACK frame is received from the slave unit to which the response frequency is allocated.

((Function at Time of Operation as Slave Unit))

Next, a function when the communication apparatus 10-3 operates as the slave unit will be described.

(Response Separation Radio Resource Allocation Function and Response Transmission Processing Function)

The data processing unit 11 acquires the designation information from the DL frame configured with one frame. Specifically, the data processing unit 11 determines whether or not its own apparatus is included in the destination of the DL frame. When its own apparatus is determined to be included in the destination of the DL frame, the data processing unit 11 acquires the information indicating the response frequency allocated to its own apparatus included in the DL frame. For example, the information indicating the response frequency is stored in the storage unit.

(Response Transmission Processing Function)

The data processing unit 11 generates the ACK frame. Specifically, when the DL frame is received from the master unit, the data processing unit 11 generates the ACK frame to the DL frame. For example, the data processing unit 11 generates the ACK frame having the first field conforming to the existing standard and the second field including the response content.

The communication unit 12 transmits the generated ACK frame on the basis of the information indicating the response frequency included in the DL frame. Specifically, when the DL frame is transmitted, the communication unit 12 modulates the second field at the response frequency acquired from the storage unit. The first field is modulated over the entire usable frequency.

4-2. Process of Communication Apparatus

Figure 12:
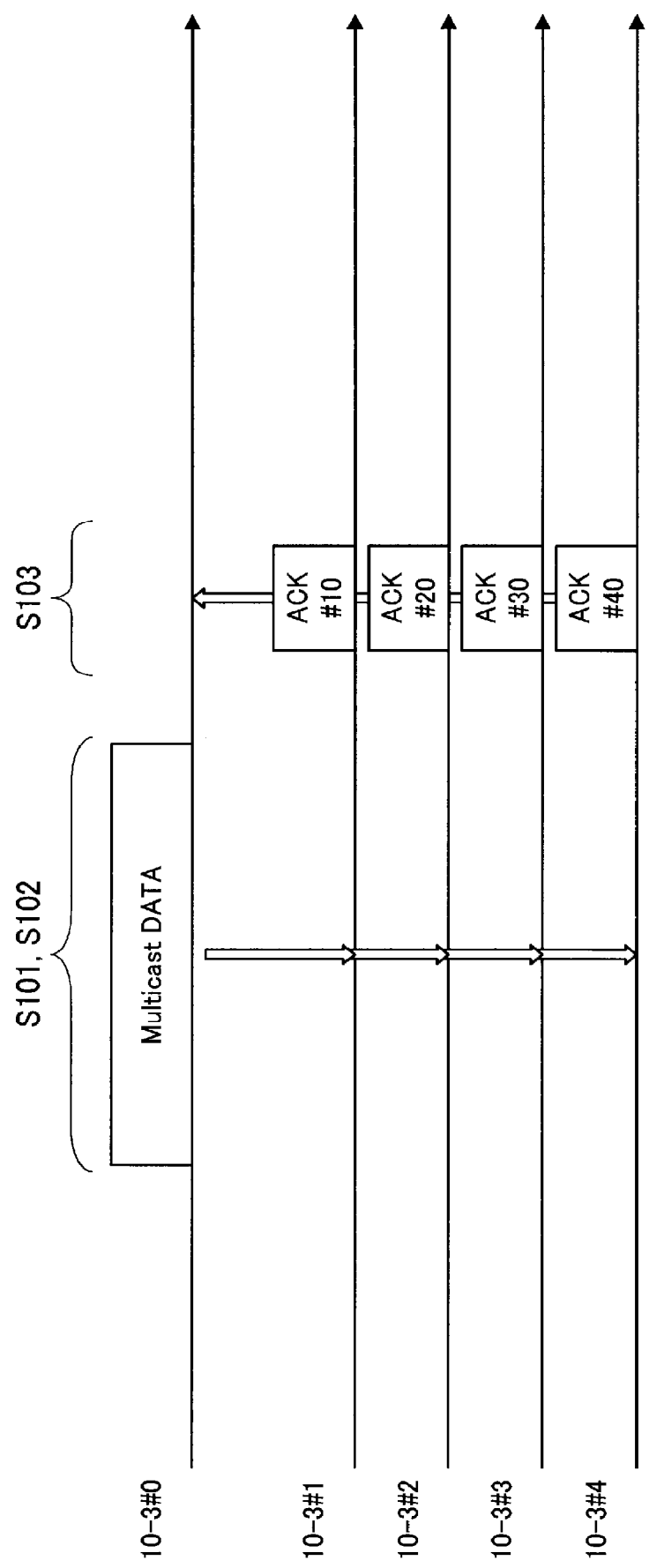
FIG. 12 is a diagram illustrating an example of a frame exchange sequence according to the present embodiment.

Next, a process of the communication system and the communication apparatus 10-3 according to the present embodiment will be described with reference to FIG. 12 and FIGS. 13 to 15. First, the flow of a process of the information system according to the present embodiment will be described with reference to FIG. 12. FIG. 12 is a diagram illustrating an example of a frame exchange sequence according to the present embodiment.

(Overall Process)

First, in the information system, the response separation radio resource allocation and the DL frame transmission process are performed (steps S101 and S102). Specifically, the DL frame including the information indicating the response frequency which is destined for a plurality of slave units is transmitted from the master unit to each of the slave units in accordance with a multicast scheme. For example, a DL frame configured with one piece of data frame Multicast DATA as illustrated in FIG. 12 is generated. Then, the DL frame is transmitted from a master unit 10-3#0 to each of slave units 10-3#1 to 10-3#4.

Then, in the information system, the process of transmitting and receiving the response to the DL frame is performed (step S103) Specifically, the response frame is transmitted from each of the slave units that have received the DL frame to the master unit. For example, as illustrated in FIG. 12, the ACK frame is transmitted from each of the slave units 10-3#1 to 10-3#4 that have received the DL frame at the same timing, and the ACK frames multiplexed as a result are received by the master unit 10-3#0.

(Response Separation Radio Resource Allocation Process and DL Frame Transmission Process)

Figure 13:
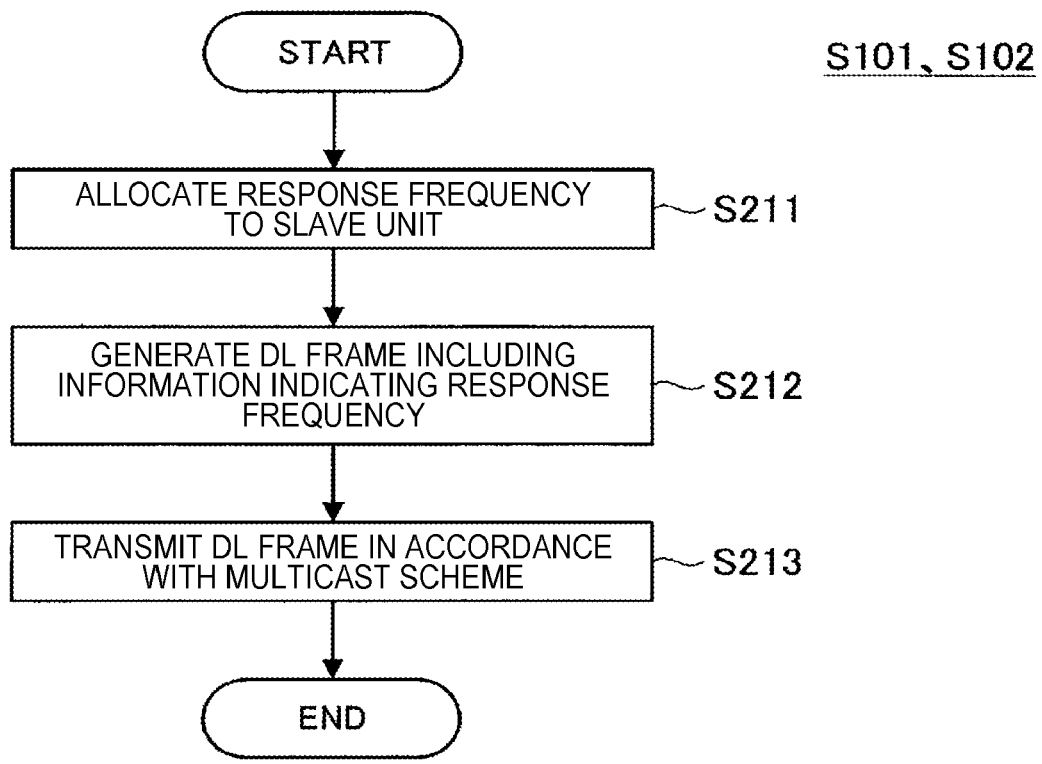
FIG. 13 is a flowchart conceptually illustrating a response separation radio resource allocation process and a DL frame transmission process of a master unit according to the present embodiment.

Next, the response separation radio resource allocation process and the DL frame transmission process of the master unit will be described with reference to FIG. 13. FIG. 13 is a flowchart conceptually illustrating the response separation radio resource allocation process and the DL frame transmission process of the master unit according to the present embodiment.

First, the master unit allocates the response frequency to the slave unit (step S211). Specifically, the control unit 17 specifies the slave units serving as a communication target and allocates different response frequencies to the specified slave units.

Then, the master unit generates the DL frame including the information indicating the response frequency (step S212). Specifically, the data processing unit 11 generates the DL frame including the information indicating the response frequency allocated by the control unit 17. The information indicating the response frequency is associated with each of the slave units serving as the destination of the DL frame.

Then, the master unit transmits the generated DL frame in accordance with the multicast scheme (step S213). Specifically, the data processing unit 11 designates each of the slave units to which the response frequency is allocated as the destination of the DL frame. Then, the communication unit 12 transmits the DL frame.

(Response Transmission Process)

Figure 14:
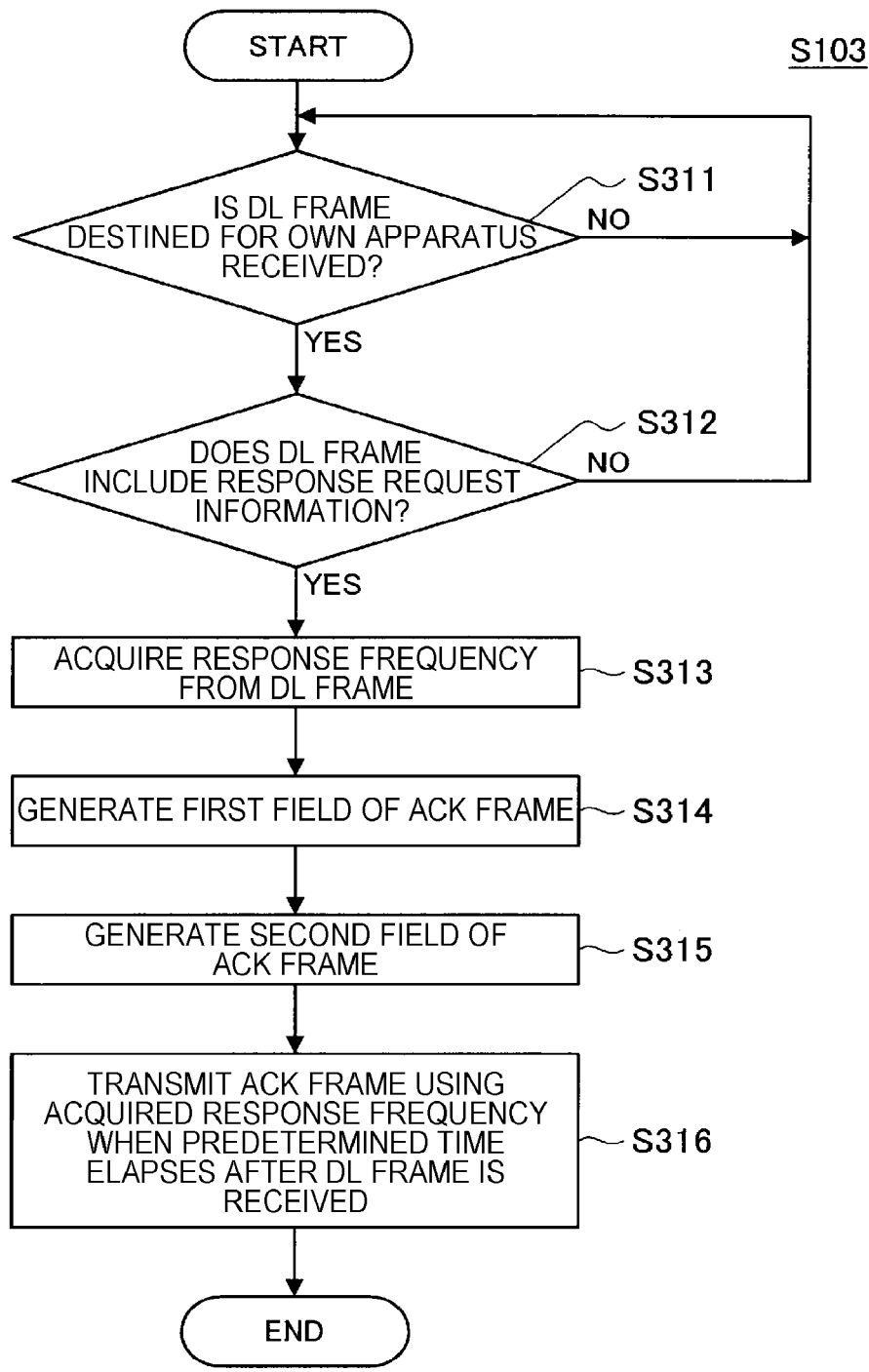
FIG. 14 is a flowchart conceptually illustrating a response transmission process of a slave unit according to the present embodiment.

Next, the response transmission process will be described with reference to FIG. 14. FIG. 14 is a flowchart conceptually illustrating the response transmission process of the slave unit according to the present embodiment. Description of processes that are substantially the same as the processes of the first or second embodiment will be omitted.

First, the slave unit determines whether or not the DL frame destined for its own apparatus is received (step S311), and when the DL frame destined for its own apparatus is determined to be received, the slave unit determines whether or not the DL frame includes the response request information (step S312).

When the DL frame is determined to include the response request information, the slave unit acquires the response frequency from the DL frame (step S313). Specifically, the data processing unit 11 acquires the information indicating the response frequency allocated to its own apparatus included in the DL frame.

Then, the slave unit generates the first field of the ACK frame (step S314), and then generates the second field (step S315).

Then, when a predetermined time elapses after the DL frame is received, the slave unit transmits the ACK frame using the acquired response frequency (step S316). Specifically, the communication unit 12 transmits the ACK frame including the first field and the second field when a predetermined time elapses after the DL frame is received. When the ACK frame is transmitted, the communication unit 12 modulates the second field at the acquired response frequency. Since the predetermined time is the same as those of other slave units, the ACK frames are consequently frequency-division multiplexed.

(Response Reception Process)

Figure 15:
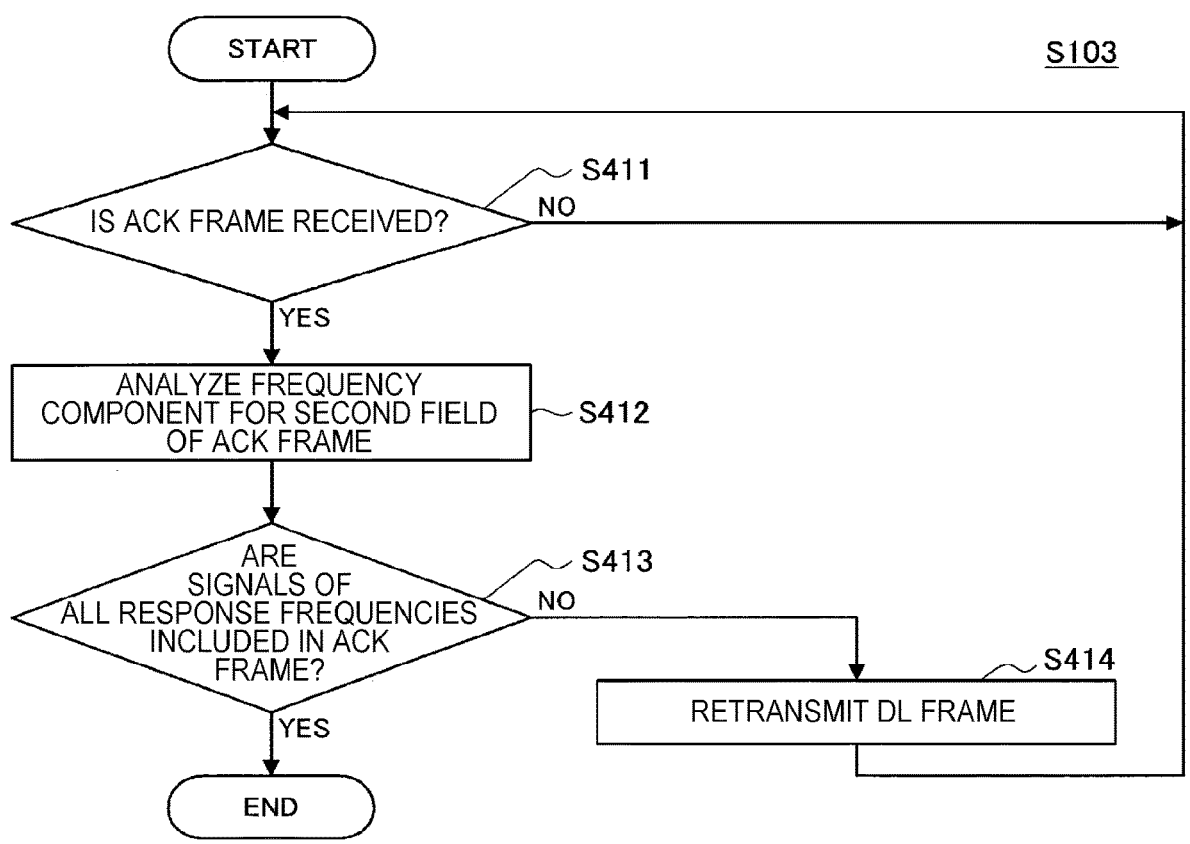
FIG. 15 is a flowchart conceptually illustrating a response reception process of a master unit according to the present embodiment.

Next, the response reception process of the master unit will be described with reference to FIG. 15. FIG. 15 is a flowchart conceptually illustrating the response reception process of the master unit according to the present embodiment.

First, the master unit is on standby until the ACK frame is received (step S411).

Upon receiving the ACK frame, the master unit analyzes the frequency component for the second field of the ACK frame (step S412). Specifically, after the reception process for the first field of the received ACK frame is performed, the communication unit 12 measures the amplitude of the frequency component included in the signal of the second field.

Then, the master unit determines whether signals of all the response frequencies are included in the ACK frame (step S413). Specifically, the communication unit 12 determines whether or not all the response frequencies are detected in the second field of the ACK frame.

When it is determined that the signals of all the response frequencies are not included in the ACK frame, the master unit retransmits the DL frame to the slave unit (step S414). Specifically, the communication unit 12 retransmits the DL frame to the slave unit to which the response frequency that is not detected is allocated. This is because the transmission of the DL frame to the slave unit to which the frequency is allocated is estimated to have failed.

Thus, according to the third embodiment of the present disclosure, the designation information designating the transmission process for multiplexing is the information indicating the frequency allocated to each of a plurality of slave units. Therefore, by using the existing function related to the frequency-division multiplexing, it is possible to improve the communication efficiency in communication of the response without adding a new function.

The DL frame indicating the designation information includes the multicast frame destined for a plurality of slave units. Therefore, it is possible to simplify the process related to the transmission and reception of the DL frame since the DL frame is transmitted to a plurality of slave units at the same timing without multiplexing or combining the DL frames.

Further, the slave unit determines whether or not the response is received on the basis of whether or not the signals of the frequencies allocated to a plurality of slave units are included in the response to the DL frame. For this reason, it is determined whether or not the response is received without separating the multiplexed responses, and thus it is possible to simplify the response reception determination process and increase the speed of the response reception determination process.

4-3. Variations

The third embodiment of the present disclosure has been described above. Note that this embodiment is not limited to the above examples. Variations of this embodiment will now be described.

As a modified example of the present embodiment, the master unit may determine whether or not the ACK frame is received on the basis of a pattern of the signal included in the ACK frame. Specifically, the communication unit 12 determines whether or not the response is received on the basis of whether content of the response obtained by demodulating the signal of the response frequency is predetermined content.

For example, when the amplitude of the response frequency is determined to be a threshold value or more by analyzing the frequency component of the second field of the ACK frame, the communication unit 12 demodulates the second field at the response frequency. Then, the communication unit 12 acquires a signal pattern which is stored in a storage unit or the like in advance, and performs a correlation calculation between the signal obtained by demodulation and the acquired signal pattern. When an output amplitude obtained through the correlation calculation is a threshold value or more, the communication unit 12 determines that the ACK frame is received from the slave unit to which the response frequency is allocated.

As described above, according to the modified example of the present embodiment, the master unit determines whether or not the response is received on the basis of whether the content of the response obtained by demodulating the signal of the response frequency is predetermined content. Therefore, by checking the pattern of the signal of the response frequency in addition to the presence or absence of the response frequency, it is possible to improve the accuracy of the determination about whether or not the ACK frame is transmitted from the slave unit to which the response frequency is allocated.

The signal pattern may be dynamically changed. For example, the master unit decides the signal pattern and transmits a DL frame including information indicating the signal pattern to the slave unit. The slave unit that has received the DL frame generates the second field of the ACK frame on the basis of the information indicating the signal pattern. Further, the slave unit may decide the signal pattern.

Further, the signal pattern may be a code sequence which is allocated to each of the slave units in advance. For example, for the second field of the ACK frame, the communication unit 12 performs a correlation calculation between the code sequence in the frequency component of the response frequency used for allocation to the slave unit and each of the response code sequences previously allocated to each of the slave units. When the correlation between the code sequence of the frequency component and one of the code sequences of the response code sequence is found to be a threshold value or more as a result of correlation calculation, for example, when the output amplitude is a threshold value or more, the communication unit 12 determines that the ACK frame is received from the slave unit to which the response frequency and the response code sequence are allocated.

5. Fourth Embodiment (Frequency-Division Multiplexed ACK to Frequency-Division Multiplexed Frame)

The communication apparatus 10-3 according to the third embodiment of the present disclosure has been described above. Next, a communication apparatus 10-4 according to a fourth embodiment of the present disclosure will be described. The DL frame related to the present embodiment and the response to the DL frame undergo frequency-division multiplexing.

5-1. Configuration of Communication Apparatus

A functional configuration of the communication apparatus 10-4 is substantially the same as the functional configurations according to the first to third embodiments, but functions of the data processing unit 11 and the communication unit 12 are partly different from those of the third embodiment. Descriptions of functions that are substantially the same as the functions of the first to third embodiments will be omitted.

((Function at Time of Operation as Master Unit))

First, a function when the communication apparatus 10-4 operates as a master unit will be described.

(Response Separation Radio Resource Allocation Function and DL Frame Transmission Processing Function)

Figure 16:
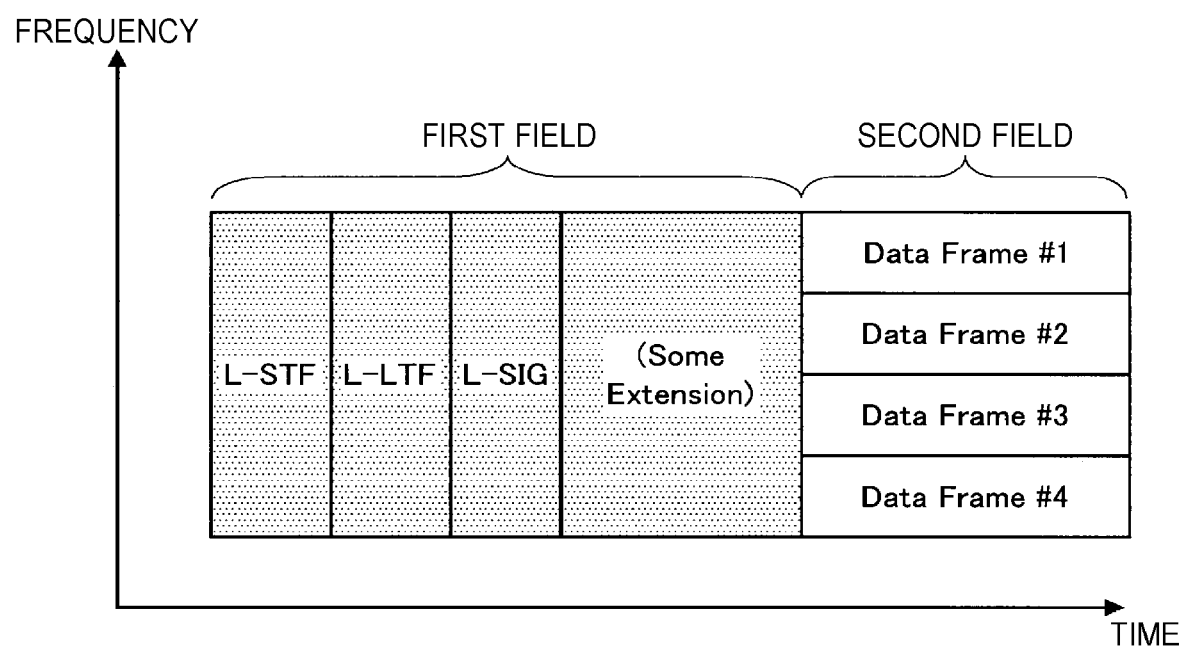
FIG. 16 is a diagram illustrating an example of a structure of a DL frame transmitted by a master unit according to a fourth embodiment of the present disclosure.

The data processing unit 11 generates the DL frame indicating the designation information for each of the slave units of the communication target. Specifically, the data processing unit 11 generates the DL frame including information indicating different frequencies (hereinafter, also referred to as "multiplexing frequencies") used for frequency-division multiplexing of DL frames for each of the slave units to which the multiplexing frequency is allocated. A structure of the DL frame according to the present embodiment will be described with reference to FIG. 16. FIG. 16 is a diagram illustrating an example of the structure of the DL frame transmitted by the master unit according to the present embodiment.

A DL frame is configured with a first field which is compatible with the existing standard and a second field in which the data frame is stored. For example, as illustrated in FIG. 16, the first field is configured with L-STF, L-LTF, L-SIG, other data portions, and the like. The data frame to be transmitted to the slave unit is stored in the second field.

Further, the data frame of the second field undergoes frequency-division multiplexing. Specifically, the second field is configured with data frames for each multiplexing frequency. For example, as illustrated in FIG. 16, the second field is configured with data frames #1 to #4 destined for slave units 10-4#1 to 10-4#4 arranged on the frequency axis.

The information indicating the multiplexing frequency may be stored in a header of the DL frame, for example, in a part of (Some Extension of) the first field illustrated in FIG. 13 or may be stored in a part of the second field. Further, the information indicating the multiplexing frequency includes information for associating the frequency used for modulation of the data frame with the slave unit. Further, the response request information may be stored in the MAC header of the data frame in the DL frame, the PLCP header of the DL frame, or the like.

The communication unit 12 transmits the DL frames at the same timing. Specifically, when the DL frame is transmitted, the communication unit 12 modulates each of the data frames stored in the second field of the DL frame using each of the multiplexing frequencies allocated to the slave units serving as the destination of the DL frame.

(Response Reception Processing Function)

Since the reception process for the response to the DL frame is substantially the same as that of the third embodiment except that the multiplexing frequency is used instead of the response frequency, it will be described in description of a process to be described later.

((Function at Time of Operation as Slave Unit))

Next, a function when the communication apparatus 10-4 operates as the slave unit will be described.

(Response Separation Radio Resource Allocation Function and Response Transmission Processing Function)

The communication unit 12 receives the DL frame which is frequency-division multiplexed. Specifically, the communication unit 12 acquires the information indicating the multiplexing frequency stored in the first field, and specifies the frequency used for modulation of the data frame destined for its own apparatus. Then, the communication unit 12 demodulates the second field of the DL frame using the specified frequency. The acquired multiplexing frequency is stored in the storage unit or the like.

(Response Transmission Processing Function)

The communication unit 12 transmits the ACK frame using the multiplexing frequency. Specifically, when the ACK frame is transmitted, the communication unit 12 acquires the multiplexing frequency specified in the DL frame reception process from the storage unit and modulates the second field of the ACK frame using the acquired multiplexing frequency.

5-2. Process of Communication Apparatus

Figure 17:
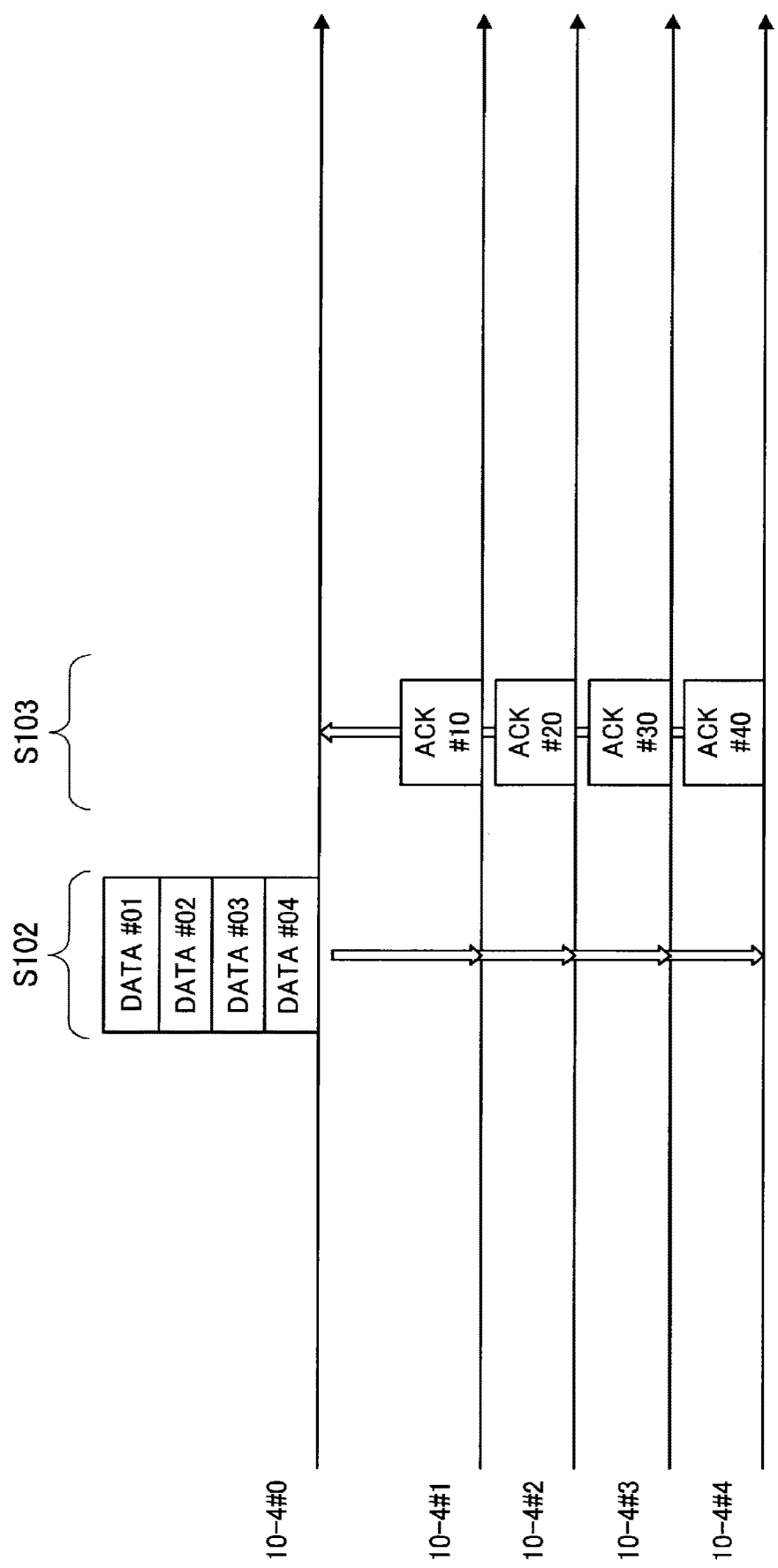
FIG. 17 is a diagram illustrating an example of a frame exchange sequence according to the present embodiment.
Figure 18:
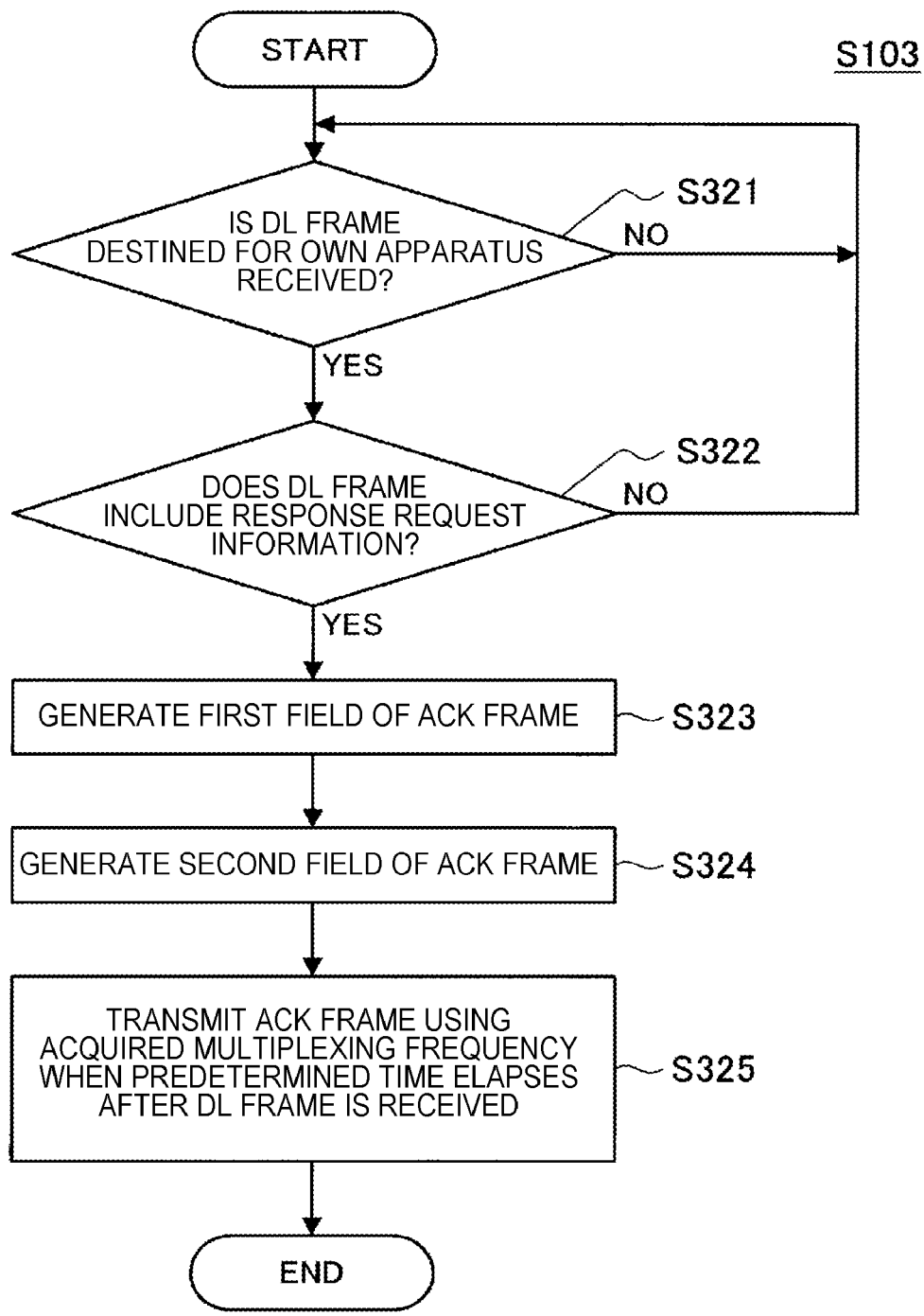
FIG. 18 is a flowchart conceptually illustrating a response transmission process of a slave unit according to the present embodiment.
Figure 19:
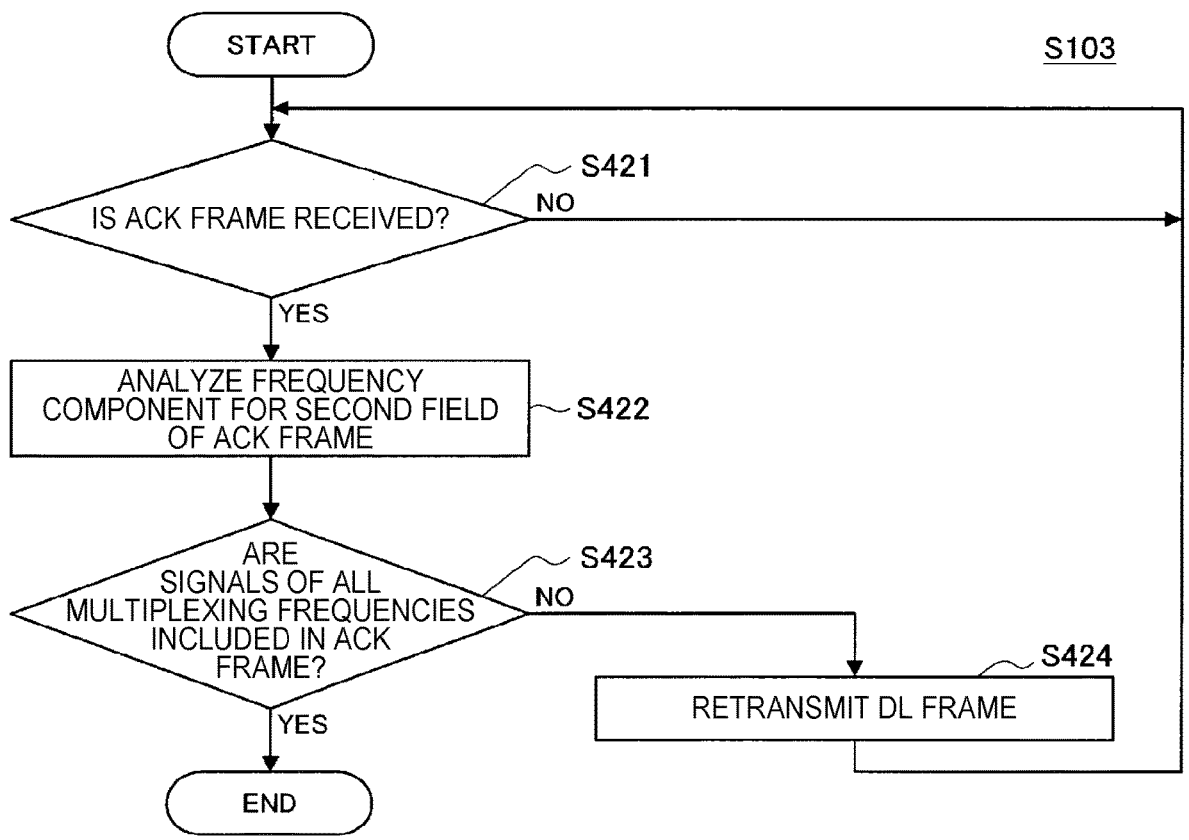
FIG. 19 is a flowchart conceptually illustrating a response reception process of a master unit according to the present embodiment.

Next, a process of the communication system and the communication apparatus 10-4 in the present embodiment will be described with reference to FIG. 17 and FIGS. 18 and 19. First, the flow of processing of the information system according to the present embodiment will be described with reference to FIG. 17. FIG. 17 is a diagram illustrating an example of a frame exchange sequence according to the present embodiment.

(Overall Process)

First, in the information system, the response separation radio resource allocation and the DL frame transmission process are performed (steps S101 and S102). Specifically, the data frame of the DL frame is frequency-division multiplexed, and the DL frame is transmitted from the master unit to each of the slave units. For example, data frames DATA #01 to #04 of the DL frame illustrated in FIG. 17 are frequency-division multiplexed. Then, the DL frame is transmitted from a master unit 10-4#0 to slave units 10-4#1 to 10-4#4.

Then, in the information system, the process of transmitting and receiving the response to the DL frame is performed (step S103). Specifically, the response frame is transmitted from each of the slave units that have received the DL frame to the master unit. For example, as illustrated in FIG. 17, the ACK frame is transmitted from each of the slave units 10-4#1 to 10-4#4 that have received the DL frame at the same timing, and the ACK frames multiplexed as a result are received by the master unit 10-4#0. The second field of the ACK frames is modulated at the frequency used for multiplexing of the DL frame.

(Response Separation Radio Resource Allocation Process and DL Frame Transmission Process)

The flow of the response separation radio resource allocation process and the DL frame transmission process according to the present embodiment is substantially the same as the flow of the process according to the third embodiment except that the response frequency allocation process is omitted, and the multiplexing frequency is used instead of the response frequency, and thus description thereof is omitted.

(Response Transmission Process)

Next, the response transmission process will be described with reference to FIG. 18. FIG. 18 is a flowchart conceptually illustrating the response transmission process of the slave unit in the present embodiment. Further, description of processes that are substantially the same as those of the first to third embodiments will be omitted.

First, the slave unit determines whether or not the DL frame destined for its own apparatus is received (step S321), and when the DL frame destined for its own apparatus is determined to be received, the slave unit determines whether or not the DL frame includes the response request information (Step S322). When the DL frame is received, the information indicating the multiplexing frequency is acquired through the communication unit 12.

When it is determined that the DL frame includes the response request information, the slave unit generates the first field of the ACK frame (step S323), and then generates the second field of the ACK frame (step S324).

Then, the slave unit transmits the ACK frame using the acquired multiplexing frequency when a predetermined time elapses after the DL frame is received (step S325). Specifically, when the ACK frame is transmitted, the communication unit 12 modulates the second field of the ACK frame using the multiplexing frequency indicated by the information acquired by the communication unit 12.

(Response Reception Process)

Next, the response reception process will be described with reference to FIG. 19. FIG. 19 is a flowchart conceptually illustrating the response reception process of the master unit according to the present embodiment. Further, description of processes that are substantially the same as those of the first to third embodiments will be omitted.

First, the master unit is on standby until the ACK frame is received (step S421), and when an ACK frame is received, the master unit analyzes the frequency component of the second field of the ACK frame (step S422).

Then, the master unit determines whether or not signals of all multiplexing frequencies are included in the ACK frame (step S423). Specifically, the communication unit 12 determines whether all the multiplexing frequencies are measured in the second field of the ACK frame.

When it is determined that the signals of all the multiplexing frequencies are not included in the ACK frame, the master unit retransmits the DL frame to the slave unit (step S414). Specifically, the communication unit 12 retransmits the DL frame to the slave unit to which the response frequency which is not measured is allocated.

As described above, according to the fourth embodiment of the present disclosure, the DL frame indicating the designation information is frequency-division multiplexed. Therefore, it is possible to transmit the DL frame to a plurality of slave units at the same timing, and it is possible to improve the communication efficiency in the transmission of the DL frame.

Further, the designation information is the information indicating the frequency used for frequency-division multiplexing of the DL frame. Therefore, in the master unit, the process of allocating the frequency to the slave unit is not separately performed, and the frequency used for transmission of the ACK frame by the slave unit is allocated to the slave unit, and thus the process of the master unit can be simplified.

The example in which the DL frames including the information indicating the multiplexing frequency are frequency-division multiplexed has been described above, but the DL frames including the information indicating the frequency may be space-division multiplexed. For example, the data processing unit 11 generates the DL frame including the information indicating the frequency allocated by the control unit 17 for each of the slave units as described above in the third embodiment, and the communication unit 12 transmits the generated DL frames using the space-division multiplexing.

6. Fifth Embodiment (Frequency-Division Multiplexed PS-Poll to Beacon Frame)

The communication apparatus 10-4 according to the fourth embodiment of the present disclosure has been described above. Next, a communication apparatus 10-5 according to a fifth embodiment of the present disclosure will be described. In the first to fourth embodiments, the communication of the response to the DL frame is an application target, but in the present embodiment, communication when the slave unit is in a power save mode is an application target. First, a problem of communication in a power save mode according to a related art will be described with reference to FIG. 20. FIG. 20 is a diagram illustrating an example of a frame exchange sequence performed in communication in the power save mode according to the related art.

In the past, when the slave unit was in the power save mode, the master unit would buffer the data frame destined for the slave unit, and information indicating that there was a buffered data frame would be included in a beacon frame to be transmitted by the master unit. For example, as illustrated in FIG. 20, the master unit 10#0 transmits the beacon frame to each of the slave units 10#1 to 10#4. The modes of the slave units 10#1 to 10#4 are the power save mode.

When the beacon frame is received, the slave unit in the power save mode causes its own state to transition from a sleep state to an active state, and when the data frame destined for its own apparatus is buffered, the slave unit transmits a power save (PS)-poll frame to the master unit. For example, the slave unit 10#1 checks that data frame Data #01 destined for its own apparatus is buffered through the beacon frame received from the master unit, and transmits the PS-poll frame to the master unit 10#0 as illustrated in FIG. 20. Hatched portions in FIG. 20 indicate that the slave unit is in an active state.

The master unit that has received the PS-poll frame transmits the data frame destined for the slave unit that has transmitted the buffered PS-poll to the slave unit, and the slave unit that has received the data frame transmits the ACK frame and then causes the state of its own apparatus to transition to the sleep state. For example, as illustrated in FIG. 20, the master unit 10#0 transmits the data frame Data #01 to the slave unit 10#1, and the slave unit 10#1 which has received the data frame transmits the ACK frame ACK #10 to the master unit and then causes the state of its own apparatus to transition to the sleep state.

The above process is sequentially performed for each of the slave units. Therefore, among the slave units that have been informed that the data frame destined for its own apparatus is buffered, slave units whose processing order is later than other slave units take longer to return the state of their own apparatuss to the sleep state than other slave units. For this reason, there are cases in which effects of power saving which is the purpose of using the power save mode are reduced.

In this regard, in the present embodiment, the master unit includes information indicating a frequency in the beacon frame, and the slave unit performs frequency-division multiplexing on the PS-poll frame using the information indicating the frequency.

6-1. Configuration of Communication Apparatus

The communication apparatus 10-5 has substantially the same functional configuration as that of the first to fourth embodiments, however, a portion of the functions of the data processing unit 11, the communication unit 12, and the control unit 17 is different from the ones of the first to fourth embodiments. Note that substantially the same functions as those of the first to fourth embodiments will not be described.

((Function at Time of Operation as Master Unit))

First, a function when the communication apparatus 10-5 operates as a master unit will be described.
(Response Separation Radio Resource Allocation Function and DL Frame Transmission Processing Function)

The control unit 17 allocates a frequency when there is a non-transmitted frame. Specifically, when there is a data frame buffered in the buffer 18, the control unit 17 allocates different response frequencies to the slave units serving as the destination of the data frame in the power save mode.

Further, the control unit 17 causes the beacon frame to be transmitted to the communication unit 12. Specifically, the control unit 17 causes the data processing unit 11 to generate the beacon frame and causes the communication unit 12 to transmit the generated beacon frame. For example, the beacon frame may be transmitted at predetermined time intervals.

The data processing unit 11 generates the beacon frame indicating the designation information. Specifically, the data processing unit 11 generates a beacon frame including information indicating that there is a non-transmitted frame (hereinafter, also referred to as "non-transmitted information"). For example, the data processing unit 11 generates a beacon frame including the information indicating the response frequency allocated by the control unit 17 and the information indicating that there is a non-transmitted frame that is buffered (hereinafter, also referred to as a "non-transmitted frame"). The non-transmitted information includes information associated with the slave unit that is the destination of the non-transmitted frame.

For example, the information indicating the frequency may be stored in a header or a payload of the beacon frame. Further, the information indicating that there is a non-transmitted frame may be stored at a position according to the existing standard. Further, in the beacon frame, the response request information is included in the header or the like, similarly to the first to fourth embodiments.

The communication unit 12 transmits the beacon frame. Specifically, the communication unit 12 transmits the generated beacon frame to each of the slave units. For example, the beacon frame may be broadcast.
(Response Reception Processing Function)

Since the process of receiving the PS-poll frame to the beacon frame is substantially the same as that of the third embodiment except that the ACK frame is replaced with the PS-poll frame, the details thereof will be described in description of a process to be described later.
((Function at Time of Operation as Slave Unit))

Next, a function when the communication apparatus 10-5 operates as the slave unit will be described.
(Response Separation Radio Resource Allocation Function and Response Transmission Processing Function)

The communication unit 12 receives the beacon frame. Specifically, when the transmission time of the beacon frame arrives, the control unit 17 causes the state of the slave unit to transition from the sleep state to the active state. After the transition to the active state is performed, the communication unit 12 receives the beacon frame transmitted from the master unit.

The data processing unit 11 acquires the designation information from the beacon frame. Specifically, when the non-transmitted information related to its own apparatus is included in the beacon frame, the data processing unit 11 acquires the information indicating the response frequency from the beacon frame. For example, the information indicating the response frequency is stored in the storage unit.
(Response Transmission Processing Function)

Figure 21A:
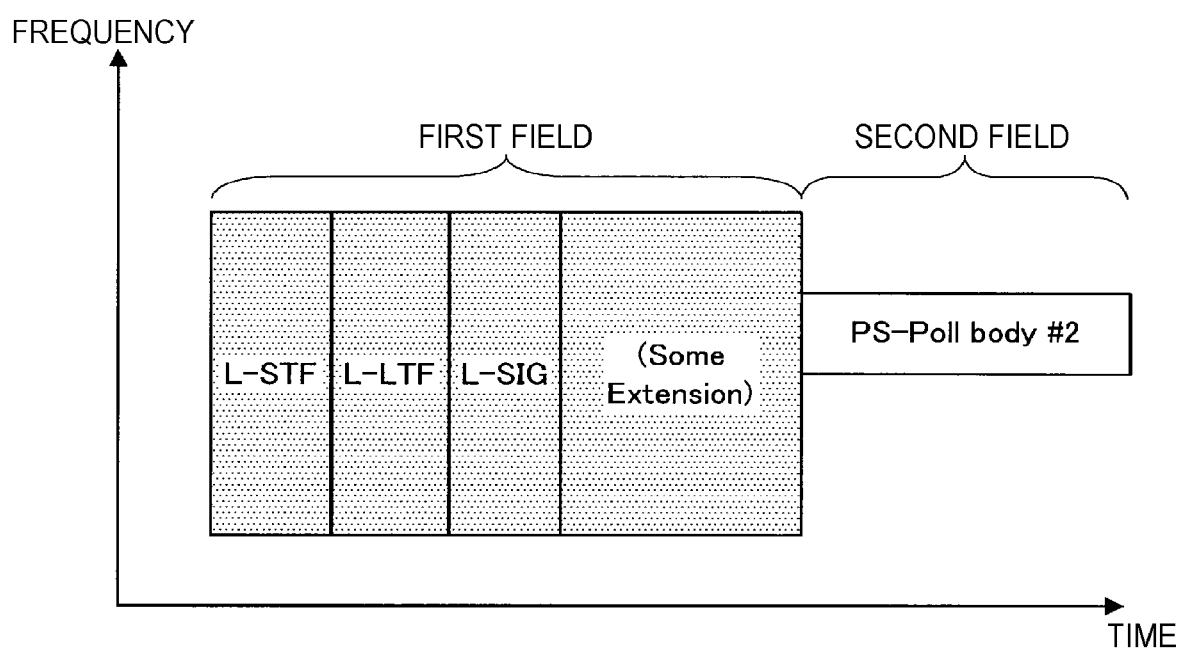
FIG. 21A is a diagram illustrating an example of a structure of a Power-Save Poll (PS-Poll) frame transmitted by a slave unit according to a fifth embodiment of the present disclosure.
Figure 21B:
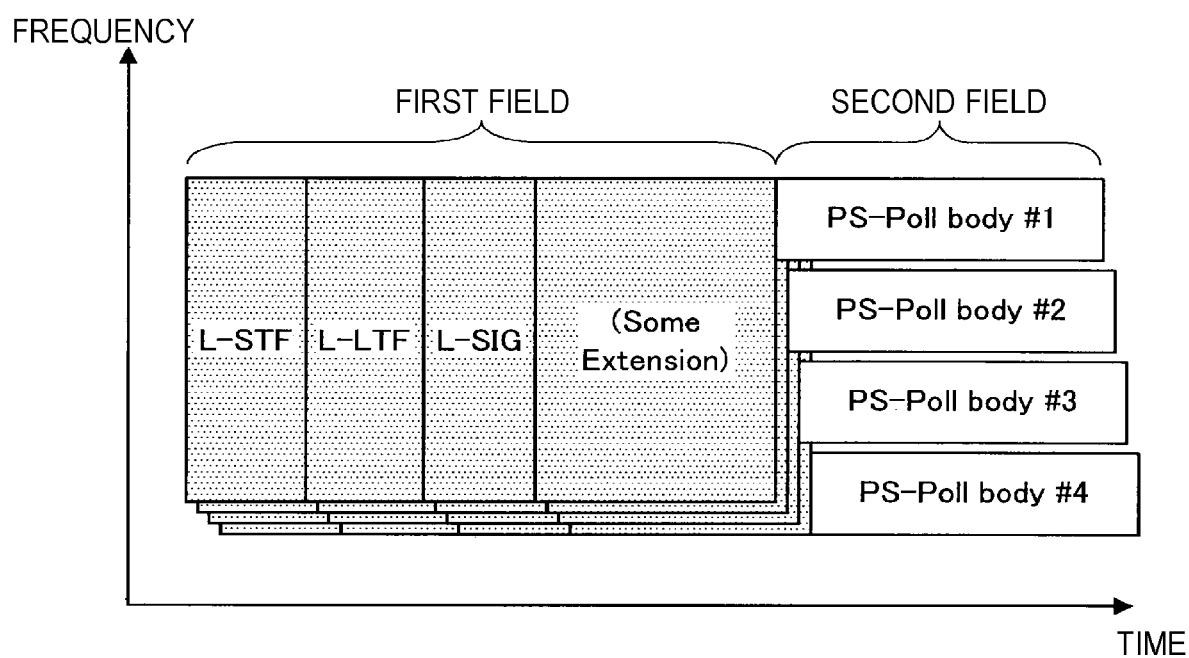
FIG. 21B is a diagram illustrating an example of a structure of a PS-poll frame transmitted by a slave unit according to the present embodiment.

Since the process of transmitting the PS-poll frame to the beacon frame is substantially the same as that of the third embodiment except that the ACK frame is replaced with the PS-poll frame, the details thereof will be described in description of a process to be described later. Therefore, only the PS-poll frame which is frequency-division multiplexed will be described with reference to FIGS. 21A and 21B. FIGS. 21A and 21B are diagrams illustrating an example of a structure of a PS-poll frame transmitted by the slave unit according to the present embodiment.

Each of the PS-poll frames is configured with a first field which is compatible with the existing standard and a second field in which the body of the PS-poll is stored. For example, as illustrated in FIG. 21A, the first field is configured with the L-STF, the L-LTF, the L-SIG other data portions, and the like. The second field may be a signal of an arbitrary pattern or a signal of a pattern which is known to the master unit.

The second field is expanded on the response frequency allocated to the slave unit serving as the transmission source of the PS-poll frame. For example, as illustrated in FIG. 21A, the body of the PS-poll of the second field is expanded on a part of the usable frequency band.

Each of the PS-poll frames undergoes frequency-division multiplexing. For example, since each of the PS-poll frames is transmitted in the same transmission period, and the second field is expanded on the response frequency allocated to each of the slave units, the second fields of the PS-polls are multiplexed so that they are arranged on the frequency axis as illustrated in FIG. 21B.

6-2. Process of Communication Apparatus

Figure 22:
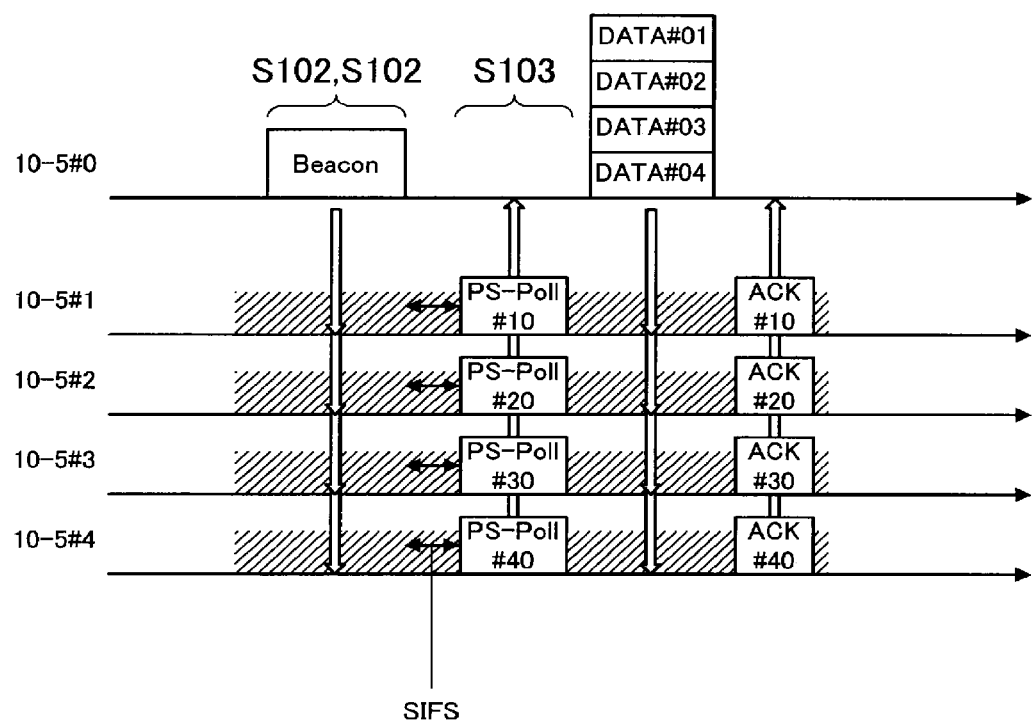
FIG. 22 is a diagram illustrating an example of a frame exchange sequence according to the present embodiment.
Figure 23:
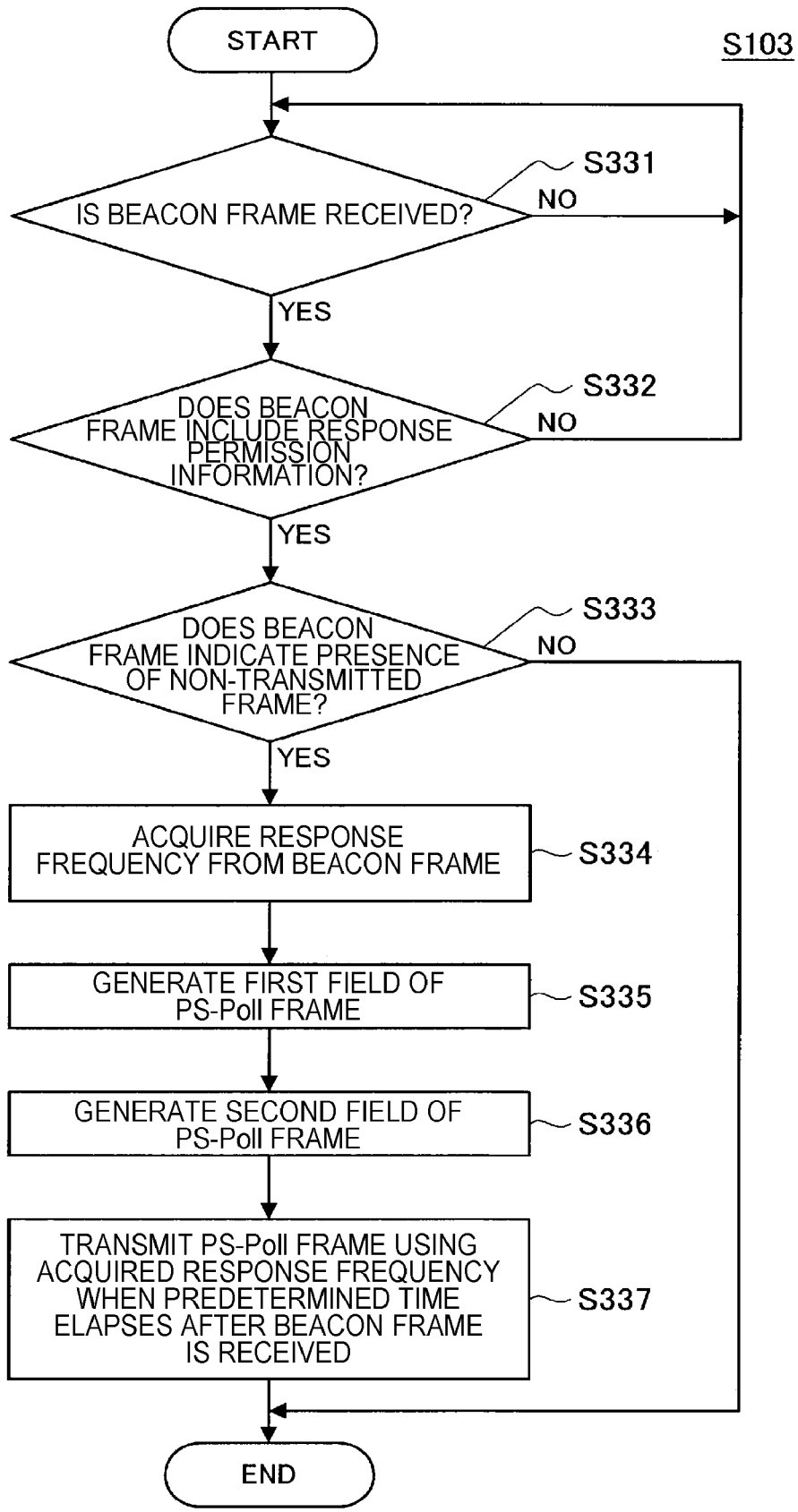
FIG. 23 is a flowchart conceptually illustrating a response transmission process of a slave unit according to the present embodiment.
Figure 24:
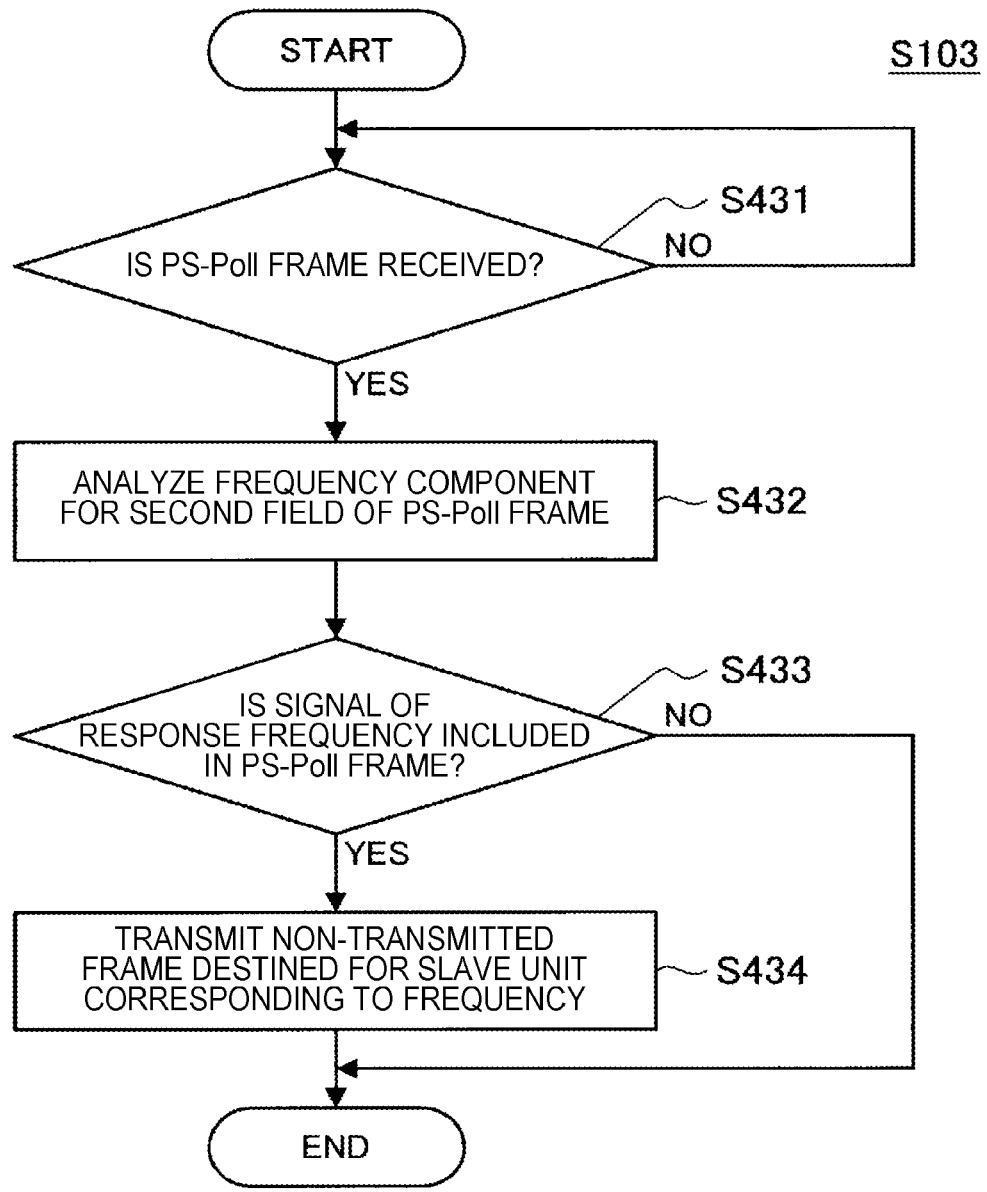
FIG. 24 is a flowchart conceptually illustrating a response reception process of a master unit according to the present embodiment.

Next, a process of the communication system and the communication apparatus 10-5 according to the present embodiment will be described with reference to FIG. 22 and FIGS. 23 and 24. First, the flow of a process of the information system according to the present embodiment will be described with reference to FIG. 22. FIG. 22 is a diagram illustrating an example of a frame exchange sequence in the present embodiment.
(Overall Process)

First, in the information system, the response separation radio resource allocation and the DL frame transmission process are performed (steps S101 and S102). Specifically, the beacon frame including the information indicating the response frequency is transmitted from the master unit to each of the slave units. For example, the beacon frame as illustrated in FIG. 22 is generated, and the beacon frame is transmitted from a master unit 10-5#0 to slave units 10-5#1 to 10-5#4.

Then, in the information system, the process of transmitting and receiving the response to the DL frame is performed (step S103). Specifically, the PS-poll frame is transmitted from each of the slave units that have received the beacon frame to the master unit. For example, as illustrated in FIG. 22, the PS-poll frame is transmitted from each of the slave units 10-5#1 to 10-5#4 that have received the beacon frame at the same timing, and the PS-poll Frames multiplexed as a result are received by the master unit 10-3#0.

The master unit that has received the PS-poll frame transmits the non-transmitted frame to each of the slave units. For example, the master unit 10-5#0 that has received the PS-poll frame transmits buffered data frames Data #01 to Data #04 to the slave units 10-5#1 to 10-5#4 using frequency-division multiplexing, similarly to the fourth embodiment.

Further, the slave unit that has received the data frame may transmit the acknowledgment response to the data frame. For example, each of the slave units 10-5#1 to 10-5#4 that have received the data frame transmits ACK frames #10 to #40 corresponding to the data frames to the master unit. Each of the slave units modulates the second field of the ACK frame at the response frequency at the time of transmission, similarly to the fourth embodiment. As a result, the ACK frames are frequency-division multiplexed.

(Response Separation Radio Resource Allocation Process and DL Frame Transmission Process)

The flow of the response separation radio resource allocation process and the DL frame transmission process according to the present embodiment are the same as the flow of the process according to the third embodiment except that the beacon frame is transmitted instead of the data frame, and the beacon frame is broadcast, and thus description thereof is omitted.

(Response Transmission Process)

Next, the response transmission process will be described with reference to FIG. 23. FIG. 23 is a flowchart conceptually illustrating the response transmission process of the slave unit according to the present embodiment. Further, descriptions of processes that are substantially the same as those of the first to fourth embodiments will be omitted.

First, the slave unit determines whether or not the beacon frame is received (step S331). Specifically, the communication unit 12 detects the reception of the beacon frame by receiving a preamble part of the beacon frame.

When it is determined that the beacon frame is received, it is determined whether the beacon frame includes the response request information (step S332).

When it is determined that the beacon frame includes the response request information, the slave unit determines whether or not the beacon frame indicates the presence of the non-transmitted frame (step S333). Specifically, the data processing unit 11 determines whether or not the non-transmitted information related to its own apparatus is included in the beacon frame. For example, the data processing unit 11 determines whether or not the non-transmitted information indicates that there is a non-transmitted frame destined for its own apparatus which is buffered.

When it is determined that the presence of a non-transmitted frame is indicated, the slave unit acquires the response frequency from the beacon frame (step S334). Specifically, when it is determined that the non-transmitted information related to its own apparatus is included in the beacon frame, the data processing unit 11 acquires the information indicating the response frequency included in the beacon frame.

Then, the slave unit generates the first field of the PS-poll frame (step S335), and then generates the second field of the PS-poll frame (step S336).

Then, the slave unit transmits the PS-poll frame using the acquired response frequency when a predetermined time elapses after the beacon frame is received (step S337). Specifically, the data processing unit 11 transmits the PS-poll frame including the first feed and the second field generated by the data processing unit 11 to the master unit when a predetermined time elapses after the beacon frame is received. Since the predetermined time is the same as those of other slave units, the PS-poll frames are consequently multiplexed. In the existing standard, since the PS-poll frame is transmitted at a random time, for example, when a DCF Inter Frame Space (DIFS) and a random backoff time elapse after the beacon frame is received, if the PS-poll frames are not multiplexed, the number of PS-poll frames to be multiplexed may vary. However, in the present embodiment, the occurrence of such a situation is suppressed.

(Response Reception Process)

Next, the response transmission process will be described with reference to FIG. 24. FIG. 24 is a flowchart conceptually illustrating the response reception process of the master unit according to the present embodiment. Further, descriptions of processes that are substantially the same as those of the first to fourth embodiments will be omitted.

First, the master unit is on standby until the PS-poll frame is received (step S431), and when the PS-poll frame is received, the master unit analyzes the frequency component of the second field of the PS-poll frame (step S432).

Then, the master unit determines whether or not the signal of the response frequency is included in the PS-poll frame (step S433). Specifically, the communication unit 12 determines whether or not all the response frequencies are detected in the second field of the PS-poll frame.

When the signal of the response frequency is determined to be included in the PS-poll frame, the master unit transmits the non-transmitted frame destined for the slave unit (step S434). Specifically, the communication unit 12 transmits the non-transmitted frame destined for the slave unit to the slave unit to which the detected response frequency is allocated.

When the signal of the response frequency is determined not to be included in the PS-poll frame, the process ends. This is because it is estimated that there is no transmission of the PS-poll frame which is the transmission request for the non-transmitted frame from the slave unit.

As described above, according to the fifth embodiment of the present disclosure, the frame indicating the designation information is a frame including the information indicating that there is a non-transmitted frame. Thus, since information related to multiplexing is included in the beacon frame serving as a trigger of the PS-poll frame, and multiplexing of the PS-poll frames is promoted, it is possible to improve the efficiency of the communication in the power save mode and reduce the power consumption of the slave unit.

7. Application Example

The technology according to the embodiments of the disclosure can be applied to various products. For example, a slave unit among the communication apparatus 10 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the slave unit may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the communication apparatus 10 may be wireless communication modules mounted in such terminals (for example, integrated circuit modules configured by one die).

On the other hand, for example, a master unit among the communication apparatus 10 may be realized as a wireless LAN access point (also referred to as a wireless base station) which has a router function or does not have a router function. The master unit may be realized as a mobile wireless LAN router. The master unit may also be a wireless communication module (for example, an integrated circuit module configured with one die) mounted on the device.

7-1. First Application Example

Figure 25:
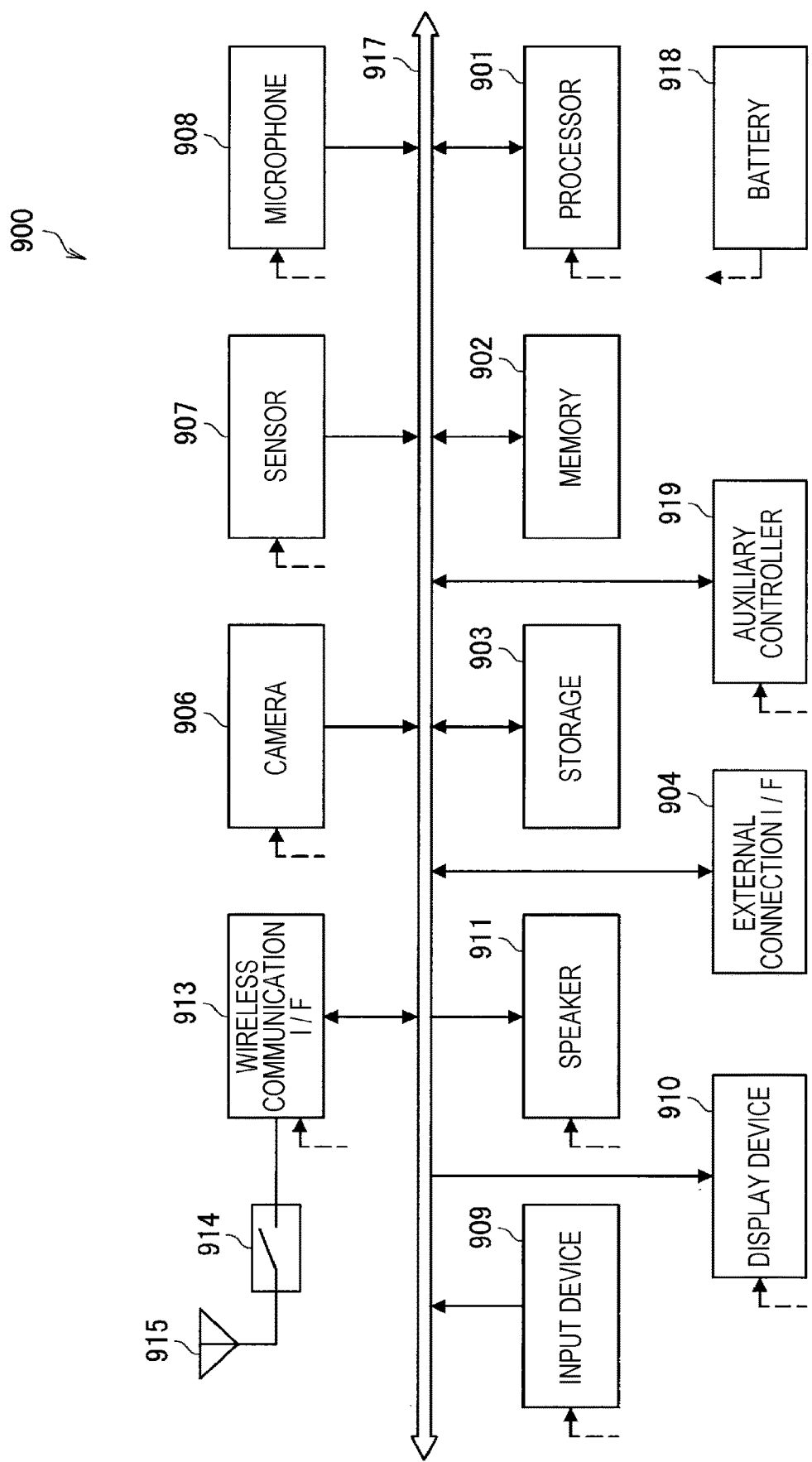
FIG. 25 is a block diagram showing an example schematic configuration of a smartphone.

FIG. 25 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 25. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 25 via power supply lines partially indicated by dashed lines in the drawing. The auxiliary controller 919 causes, for example, necessary minimum functions of the smartphone 900 to be operated in a sleep mode.

In the smartphone 900 shown in FIG. 25, the data processing unit 11, the communication unit 12, and the control unit 17 described with reference to FIG. 3 may be mounted in the wireless communication interface 913. At least some of the functions may be mounted on the processor 901 or the auxiliary controller 919. For example, since the frame indicating the designation information designating the transmission process for multiplexing is generated by the data processing unit 11, the responses to the frame are multiplexed, and the communication efficiency can be improved.

Note that the smartphone 900 may operate as a wireless access point (software AP) as the processor 901 executes the function of an access point at an application level. In addition, the wireless communication interface 913 may have the function of a wireless access point.

7-2. Second Application Example

Figure 26:
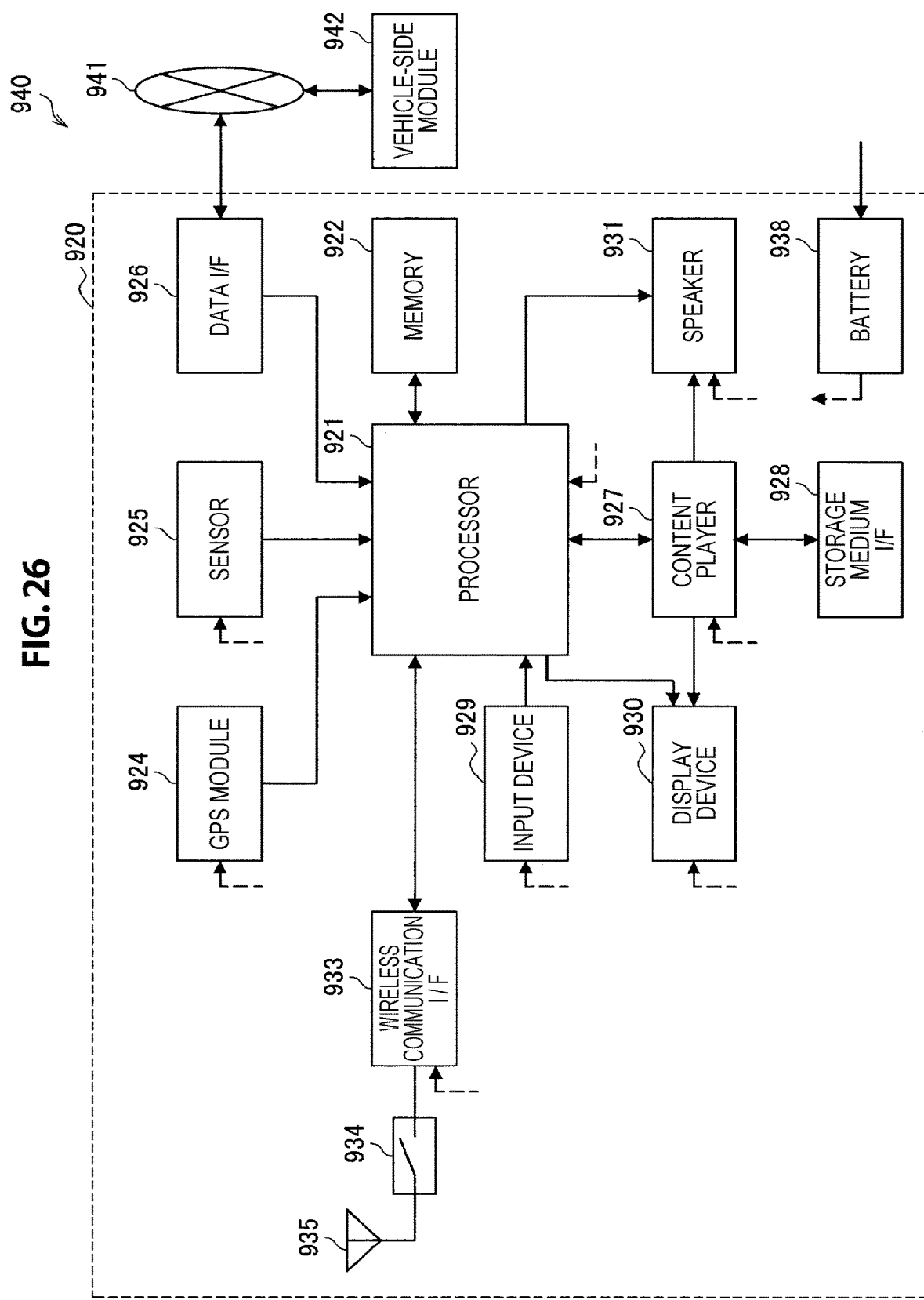
FIG. 26 is a block diagram showing an example schematic configuration of a car navigation device.

FIG. 26 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device

929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 26. In this case, the antenna switch 934 may be omitted from the configuration of the car navigation device 920.

The battery 938 supplies electric power to each of the blocks of the car navigation device 920 shown in FIG. 26 via power supply lines partially indicated by dashed lines in the drawing. In addition, the battery 938 accumulates electric power supplied from the vehicle.

In the car navigation device 920 shown in FIG. 26, the data processing unit 11, the communication unit 12, and the control unit 17 described with reference to FIG. 3 may be mounted in the wireless communication interface 933. At least some of the functions may be mounted on the processor 921. For example, since the frame indicating the designation information designating the transmission process for multiplexing is generated by the data processing unit 11, the responses to the frame are multiplexed, and the communication efficiency can be improved.

Further, the wireless communication interface 933 may operate as the master unit described above and may provide a wireless connection to a terminal of a user riding in a vehicle. At that time, for example, when there are a plurality of terminals, it is possible to multiplex the response frames from the terminals of the user and thus improve the communication efficiency of the response frame.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

7-3. Third Application Example

Figure 27:
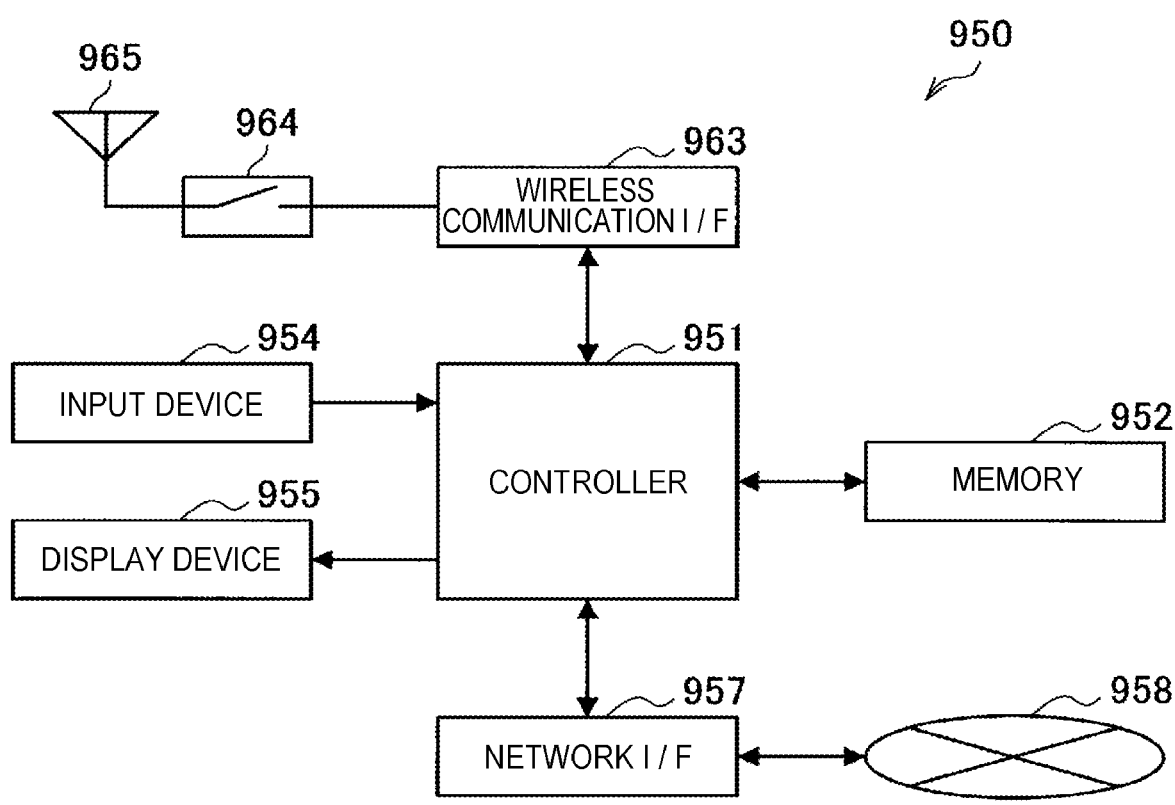
FIG. 27 is a block diagram showing an example schematic configuration of a wireless access point.

FIG. 27 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 27, the data processing unit 11, the communication unit 12, and the control unit 17 described with reference to FIG. 3 may be mounted on the wireless communication interface 963. At least some of the functions may be mounted on the controller 951. For example, since the frame indicating the designation information designating the transmission process for multiplexing is generated by the data processing unit 11, the responses to the frame are multiplexed, and the communication efficiency can be improved.

8. Conclusion

According to the first embodiment of the present disclosure, the responses to the frame transmitted to the slave unit are multiplexed on the basis of the designation information, and thus it is possible to improve the communication efficiency while preventing the collision of the responses.

According to the second embodiment of the present disclosure, the DL frame is transmitted to a plurality of slave units at the same timing without being multiplexed, and thus signal processing related to multiplexing is omitted, and it is possible to simplify the process and the configuration related to communication of the master unit.

Further, according to the third embodiment of the present disclosure, the existing functions related to the frequency-division multiplexing are used, and thus it is possible to improve the communication efficiency in the communication of the response without adding a new function.

Further, according to the fourth embodiment of the present disclosure, it is possible to transmit the DL frame to a plurality of slave units at the same timing and to improve the communication efficiency when the DL frame is transmitted.

Further, according to the fifth embodiment of the present disclosure, the information related to multiplexing is included in the beacon frame serving as a trigger of the PS-poll frame, and the multiplexing of the PS-poll frames is promoted, and thus it is possible to improve the efficiency of communication in the power save mode and further reduce the power consumption of the slave unit.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, the frame transmitted as the DL frame or the like has been described as being a data frame, but the present technology is not limited to this example. For example, the transmitted frame may be a control frame or a management frame.

Further, in the first to fourth embodiments, the DL frame may be any one of a space-division multiplexed frame, an aggregation frame, a multicast frame, and a frequency multiplexed frame.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication apparatus, including:

a processing unit configured to generate a frame indicating designation information designating a transmission process for multiplexing differing for each of a plurality of other communication apparatuses; and a communication unit configured to transmit the frame generated by the processing unit to the plurality of other communication apparatuses.

(2)

The communication apparatus according to (1), wherein the designation information is a code allocated to each of the plurality of other communication apparatuses.

(3)

The communication apparatus according to (2), wherein each of cross-correlations between the code and codes allocated to the plurality of other communication apparatuses is less than or equal to a correlation with a pseudo noise code.

(4)

The communication apparatus according to (2) or (3), wherein a sequence forming the code is arranged in a time axis direction or in a frequency axis direction.

(5)

The communication apparatus according to (1), wherein the designation information is information indicating a frequency allocated to each of the plurality of other communication apparatuses.

(6)

The communication apparatus according to any one of (1) to (5), wherein the frame indicating the designation information includes a training signal request frame.

(7)

The communication apparatus according to any one of (1) to (5), wherein the frame indicating the designation information includes a frame configured with frames which are temporally combined and destined for the plurality of other communication apparatuses.

(8)

The communication apparatus according to any one of (1) to (5), wherein the frame indicating the designation information includes a multicast frame destined for the plurality of other communication apparatuses.

(9)

The communication apparatus according to any one of (1) to (5), wherein the frame indicating the designation information is frequency-division multiplexed.

(10)

The communication apparatus according to (9), wherein the designation information is information indicating a frequency used for frequency-division multiplexing of the frame including the designation information.

(11)

The communication apparatus according to any one of (1) to (5), wherein the frame indicating the designation information has information indicating that there is a non-transmitted frame.

(12)

The communication apparatus according to any one of (1) to (11), wherein the communication unit receives multiplexed responses which are transmitted, in response to the frame indicating the designation information, from the plurality of other communication apparatuses when a predetermined time elapses after the frame indicating the designation information is received, and the processing unit determines whether or not the response is received on the basis of the designation information.

(13)

The communication apparatus according to (12), wherein the processing unit performs the determination on the basis of a result of a correlation calculation between a code included in the response and a code allocated to each of the plurality of other communication apparatuses.

(14)

The communication apparatus according to (12), wherein the processing unit performs the determination on the basis of whether the response includes a signal of a frequency allocated to each of the plurality of other communication apparatuses.

(15)

The communication apparatus according to (14), wherein the processing unit performs the determination on the basis of whether content of the response obtained by demodulating the signal is predetermined content.

(16)

The communication apparatus according to any one of (1) to (15), wherein the frame indicating the designation information includes response request information indicating a transmission request for a response to the frame indicating the designation information.

(17)

A communication apparatus, including:

a processing unit configured to perform a reception process of receiving a frame from another communication apparatus, and process a response to the frame in accordance with a transmission process indicated from the other communication apparatus.

(18)

A communication method, including:

generating a frame indicating designation information designating a transmission process for multiplexing differing for each of a plurality of other communication apparatuses; and transmitting the generated frame to the plurality of other communication apparatuses.

(19)

A communication method, including:

performing a reception process of receiving a frame from another communication apparatus; and processing a response to the frame in accordance with a transmission process indicated from the other communication apparatus, the transmission process differing for each of a plurality of communication apparatuses.

(20)

A program causing a computer to implement:

a processing function of generating a frame indicating designation information designating a transmission process for multiplexing differing for each of a plurality of other communication apparatuses; and a communication function of transmitting the generated frame to the plurality of other communication apparatuses.

(21)

A program causing a computer to implement:

a processing function of performing a reception process of receiving a frame from another communication apparatus, and processing a response to the frame in accordance with a transmission process indicated from the other communication apparatus, the transmission process differing for each of a plurality of communication apparatuses.

(22)

A communication system, including:

a processing unit configured to generate a frame indicating designation information designating a transmission process for multiplexing differing for each of a plurality of other communication apparatuses; and a communication unit configured to transmit the generated frame to the plurality of other communication apparatuses.

(23)

A communication system, including:

a processing unit configured to perform a reception process of receiving a frame from another communication apparatus, and process a response to the frame in accordance with a transmission process indicated from the other communication apparatus, the transmission process differing for each of a plurality of communication apparatuses.

REFERENCE SIGNS LIST 10 communication apparatus
11 data processing unit
12 communication unit
13 modulation/demodulation unit
14 signal processing unit
15 channel estimation unit
16 radio interface unit
17 control unit
18 buffer

The invention claimed is:

1. A communication apparatus, comprising:

circuitry configured to generate a frame that includes an indication of designation information, the designation information designates a transmission process for multiplexing, and the transmission process for multiplexing being different for each of a plurality of other communication apparatuses;

transmit the frame to the plurality of other communication apparatuses to instruct one of the plurality of other communication apparatuses to perform communication according to the designated transmission process for multiplexing;

receive multiplexed responses which are transmitted, in response to the frame indicating the designation information, from the plurality of other communication apparatuses when a predetermined time elapses after the frame indicating the designation information is received; and determine whether or not the response is received on the basis of the designation information, wherein the designation information is information indicating a frequency allocated to each of the plurality of other communication apparatuses, and wherein the frame indicating the designation information includes a training signal request frame and the training signal request frame includes information indicating a response code sequence.

2. The communication apparatus according to claim 1, wherein the frame indicating the designation information includes a frame configured with frames which are temporally combined and destined for the plurality of other communication apparatuses.

3. The communication apparatus according to claim 1, wherein the frame indicating the designation information includes a multicast frame destined for the plurality of other communication apparatuses.

4. The communication apparatus according to claim 1, wherein the frame indicating the designation information is frequency-division multiplexed.

5. The communication apparatus according to claim 4, wherein the designation information is information indicating a frequency used for frequency-division multiplexing of the frame including the designation information.

6. The communication apparatus according to claim 1, wherein the frame indicating the designation information has information indicating that there is a non-transmitted frame.

7. The communication apparatus according to claim 1, wherein the circuitry is further configured to perform the determination on the basis of whether the response includes a signal of a frequency allocated to each of the plurality of other communication apparatuses.

8. The communication apparatus according to claim 7, wherein the circuitry is further configured to perform the determination on the basis of whether content of the response obtained by demodulating the signal is predetermined content.

9. The communication apparatus according to claim 1, wherein the frame indicating the designation information includes response request information indicating a transmission request for a response to the frame indicating the designation information.

10. The communication apparatus according to claim 1, wherein the response code sequence is allocated to a slave unit.

11. The communication apparatus according to claim 1, wherein the multiplexed responses are PS-Poll frames.

12. A communication apparatus, comprising:
circuitry configured to
perform a reception process of receiving a frame from another communication apparatus, and
process a response to the frame in accordance with a transmission process for multiplexing indicated from the other communication apparatus, the transmission process for multiplexing being different for each of a plurality of communication apparatuses, wherein the indicated transmission process for multiplexing includes information indicating a frequency allocated to each of the plurality of communication apparatuses, and wherein the frame includes designation information that includes a training signal request frame, and the training signal request frame includes information indicating a response code sequence.

13. A communication method, comprising:
generating a frame that includes an indication of designation information, the designation information designates a transmission process for multiplexing, and the transmission process for multiplexing is different for each of a plurality of other communication apparatuses;
transmitting the generated frame plurality of other communication apparatuses to instruct one of the plurality of other communication apparatuses to perform communication according to the designated transmission process for multiplexing;
receiving multiplexed responses which are transmitted, in response to the frame indicating the designation information, from the plurality of other communication apparatuses when a predetermined time elapses after the frame indicating the designation information is received; and
determining whether or not the response is received on the basis of the designation information, wherein the designation information is information indicating a frequency allocated to each of the plurality of other communication apparatuses, and wherein the frame indicating the designation information includes a training signal request frame, and the training signal request frame includes information indicating a response code sequence.

14. A communication method, comprising:
performing a reception process of receiving a frame from another communication apparatus; and
processing a response to the frame in accordance with a transmission process for multiplexing indicated from the other communication apparatus, the transmission process for multiplexing being different for each of a plurality of communication apparatuses, wherein the indicated transmission process for multiplexing includes information indicating a frequency allocated to each of the plurality of communication apparatuses, and wherein the frame includes designation information that includes a training signal request frame, and the training signal request frame includes information indicating a response code sequence.

\* \* \* \* \*